(12) United States Patent
Forbes Jones et al.

(10) Patent No.: US 9,027,374 B2
(45) Date of Patent: May 12, 2015

(54) METHODS TO IMPROVE HOT WORKABILITY OF METAL ALLOYS

(71) Applicant: ATI Properties, Inc., Albany, OR (US)

(72) Inventors: Robin M. Forbes Jones, Charlotte, NC (US); Richard L. Kennedy, Monroe, NC (US); Wei-Di Cao, Charlotte, NC (US)

(73) Assignee: ATI Properties, Inc., Albany, OR (US)

( * ) Notice: Subject to any disclaimer, the term of this patent is extended or adjusted under 35 U.S.C. 154(b) by 92 days.

(21) Appl. No.: 13/833,144

(22) Filed: Mar. 15, 2013

(65) Prior Publication Data

US 2014/0260478 A1 Sep. 18, 2014

(51) Int. Cl.
| | |
|---|---|
| *B23P 17/00* | (2006.01) |
| *B05D 1/04* | (2006.01) |
| *B21J 1/02* | (2006.01) |
| *B21J 1/06* | (2006.01) |
| *B21J 3/00* | (2006.01) |
| *B21C 23/32* | (2006.01) |
| *C23C 4/04* | (2006.01) |
| *C23C 4/10* | (2006.01) |
| *C23C 4/18* | (2006.01) |
| *C23C 24/04* | (2006.01) |

(52) U.S. Cl.
CPC ..... *B21J 1/02* (2013.01); *B21J 1/06* (2013.01); *B21J 3/00* (2013.01); *B21C 23/32* (2013.01); *C23C 4/04* (2013.01); *C23C 4/10* (2013.01); *C23C 4/18* (2013.01); *C23C 24/04* (2013.01)

(58) Field of Classification Search
CPC ................. B21J 1/02; B21J 1/06; B21J 3/00; B21C 23/32; C23C 4/04; C23C 4/10; C23C 4/18; C23C 24/04
USPC ............ 72/46, 47; 29/424, 460, 527.2, 527.4; 227/190, 455; 428/433
See application file for complete search history.

(56) References Cited

U.S. PATENT DOCUMENTS

| | | | |
|---|---|---|---|
| 899,827 | A | 9/1908 | Cutter |
| 2,191,478 | A | 2/1940 | Hopkins |
| 2,295,702 | A | 9/1942 | Wissler |
| 3,001,059 | A | 9/1961 | Jones |
| 3,021,594 | A | 2/1962 | Clatot et al. |
| 3,122,828 | A | 3/1964 | Havel |

(Continued)

FOREIGN PATENT DOCUMENTS

| | | |
|---|---|---|
| CN | 101517112 A | 8/2009 |
| EP | 386515 | 2/1990 |

(Continued)

OTHER PUBLICATIONS

Atlan et al., Metal Forming: Fundamentals and Applications, Ch. 6. Friction in Metal Forming, ASM: 1983.

(Continued)

*Primary Examiner* — David B Jones
(74) *Attorney, Agent, or Firm* — K&L Gates LLP; John E. Grosselin, III

(57) ABSTRACT

A method of processing an alloy workpiece to reduce thermal cracking may comprise spraying a metallic coating material onto at least a portion of a surface of the alloy workpiece to form a surface coating metallurgically bonded to the alloy workpiece. The surface coating may be more ductile than the alloy workpiece and reduces heat loss from the alloy workpiece.

86 Claims, 5 Drawing Sheets

(56) References Cited

U.S. PATENT DOCUMENTS

| | | | |
|---|---|---|---|
| 3,339,271 A | 9/1967 | Durfee et al. | |
| 3,446,606 A | 5/1969 | Friedrich et al. | |
| 3,493,713 A | 2/1970 | Johnson | |
| 3,617,685 A | 11/1971 | Brill-Edwards et al. | |
| 3,693,419 A | 9/1972 | De Pierre et al. | |
| 3,814,212 A | 6/1974 | Latos | |
| 3,992,202 A | 11/1976 | Dulis et al. | |
| 4,055,975 A | 11/1977 | Serfozo et al. | |
| 4,060,250 A | 11/1977 | Davis et al. | |
| 4,544,523 A | 10/1985 | McCollough et al. | |
| 4,728,448 A | 3/1988 | Sliney | |
| 4,744,504 A | 5/1988 | Turner | |
| 4,780,484 A | 10/1988 | Schubert et al. | |
| 4,935,198 A | 6/1990 | Tornberg | |
| 4,961,991 A | 10/1990 | Howard | |
| 5,052,464 A * | 10/1991 | Natori | 428/614 |
| 5,298,095 A | 3/1994 | Russo et al. | |
| 5,302,414 A | 4/1994 | Alkhimov et al. | |
| 5,348,446 A | 9/1994 | Lee et al. | |
| 5,374,323 A | 12/1994 | Kuhlman et al. | |
| 5,525,779 A | 6/1996 | Santella et al. | |
| 5,665,180 A | 9/1997 | Seetharaman et al. | |
| 5,743,121 A | 4/1998 | Miller | |
| 5,783,530 A | 7/1998 | Foster et al. | |
| 5,788,142 A | 8/1998 | Bigay et al. | |
| 5,908,670 A * | 6/1999 | Dunkerley et al. | 427/449 |
| 5,951,792 A | 9/1999 | Balbach | |
| 6,120,624 A | 9/2000 | Vogt et al. | |
| 6,154,959 A | 12/2000 | Goodwater et al. | |
| 6,269,669 B1 * | 8/2001 | Matsubara et al. | 72/53 |
| 6,309,591 B1 | 10/2001 | Yoo et al. | |
| 6,312,022 B1 | 11/2001 | Brophy, III et al. | |
| 6,329,079 B1 | 12/2001 | Meyer | |
| 6,330,818 B1 | 12/2001 | Jain | |
| 6,418,795 B2 | 7/2002 | Im et al. | |
| 6,484,790 B1 | 11/2002 | Myers et al. | |
| 6,547,952 B1 * | 4/2003 | Staerzl | 205/724 |
| 6,623,690 B1 | 9/2003 | Rizzo et al. | |
| 6,753,504 B2 | 6/2004 | Keller et al. | |
| 6,773,824 B2 | 8/2004 | Rizzo et al. | |
| 6,933,058 B2 | 8/2005 | Darolia | |
| 7,000,306 B2 | 2/2006 | Rice et al. | |
| 7,108,483 B2 | 9/2006 | Segletes et al. | |
| 7,114,548 B2 | 10/2006 | Forbes | |
| 7,172,820 B2 | 2/2007 | Darolia et al. | |
| 7,208,116 B2 | 4/2007 | Manning et al. | |
| 7,257,981 B2 | 8/2007 | Natsui et al. | |
| 7,264,888 B2 | 9/2007 | Darolia et al. | |
| 7,288,328 B2 | 10/2007 | Darolia et al. | |
| 7,316,057 B2 | 1/2008 | Seth | |
| 7,357,958 B2 | 4/2008 | Darolia et al. | |
| 7,516,526 B2 | 4/2009 | Rice et al. | |
| 7,618,684 B2 * | 11/2009 | Nesbitt | 427/470 |
| 7,722,330 B2 | 5/2010 | Seth | |
| 7,770,427 B2 | 8/2010 | Nakahara et al. | |
| 7,927,085 B2 | 4/2011 | Hall et al. | |
| 8,230,899 B2 | 7/2012 | Minisandram | |
| 8,303,289 B2 | 11/2012 | Goller et al. | |
| 8,327,681 B2 * | 12/2012 | Davidson et al. | 72/368 |
| 8,545,994 B2 * | 10/2013 | Facchini et al. | 428/687 |
| 8,757,244 B2 | 6/2014 | Minisandram | |
| 8,789,254 B2 * | 7/2014 | Minisandram et al. | 29/424 |
| 2002/0019321 A1 | 2/2002 | Balliett et al. | |
| 2004/0079453 A1 | 4/2004 | Groh et al. | |
| 2004/0105774 A1 | 6/2004 | Del Corso et al. | |
| 2005/0044800 A1 | 3/2005 | Hall et al. | |
| 2005/0273994 A1 | 12/2005 | Bergstrom et al. | |
| 2006/0239852 A1 | 10/2006 | Shipton et al. | |
| 2011/0195270 A1 | 8/2011 | De Souza et al. | |
| 2011/0302978 A1 | 12/2011 | Oppenheimer et al. | |
| 2011/0302979 A1 | 12/2011 | Oppenheimer et al. | |
| 2013/0142686 A1 | 6/2013 | Lipetzky | |
| 2014/0246165 A1 | 9/2014 | Minisandram | |
| 2014/0271337 A1 | 9/2014 | Banik et al. | |
| 2014/0290321 A1 | 10/2014 | Minisandram | |

FOREIGN PATENT DOCUMENTS

| | | |
|---|---|---|
| EP | 0767028 | 4/1997 |
| EP | 0969114 | 1/2000 |
| EP | 1197570 | 4/2002 |
| EP | 2286942 A1 | 2/2011 |
| GB | 684013 A | 12/1952 |
| GB | 1202080 A | 8/1970 |
| GB | 1207675 A | 10/1970 |
| GB | 2190319 A | 11/1987 |
| GB | 2262540 A | 6/1993 |
| JP | 52-114524 A | 9/1977 |
| JP | 53-108842 A | 9/1978 |
| JP | 54-52656 A | 4/1979 |
| JP | 56-109128 A | 8/1981 |
| JP | H01-274319 | 11/1989 |
| JP | 2009-66661 A | 7/1991 |
| JP | H03-174937 A | 7/1991 |
| JP | 6-63743 A | 3/1994 |
| JP | 11-320073 | 11/1999 |
| JP | 2000-312905 A | 11/2000 |
| JP | 2003-239025 A | 8/2003 |
| RU | 2133652 C1 | 7/1999 |
| RU | 2145981 C1 | 2/2000 |
| SU | 1761364 A1 | 9/1992 |
| WO | WO 94/13849 A1 | 6/1994 |
| WO | WO 95/35396 | 12/1995 |
| WO | WO 98/05463 A1 | 2/1998 |
| WO | WO 99/02743 A1 | 1/1999 |
| WO | WO 01/12381 | 2/2001 |
| WO | WO 02/27067 A1 | 4/2002 |

OTHER PUBLICATIONS

Donachie et al., Superalloys: A Technical Guide, Melting and Conversion, pp. 56-77, ASM International, 2002.

Paton et al., ESS LM as a way for heavy ingot manufacturing, LMPC, 2007.

ASTM E2465—06 (2006): Standard Test Method for Analysis of Ni-Base Alloys by X-ray Fluorescence Spectrometry.

ASTM E1019 —08 (2008): Standard Test Methods for Determination of Carbon, Sulfur, Nitrogen, and Oxygen in Steel, Iron, Nickel, and Cobalt Alloys by Various Combustion and Fusion Techniques.

Santella, An overview of the welding of Ni3Al and Fe3Al alloys, ASME and ASM Materials Conference, Dec. 31, 1996.

Levin et al., Robotic weld overlay coatings for erosion control, Quarterly Technical Progress Report for U.S. DOE Grant No. DE-FG22-92PS92542, Lehigh University, Energy Research Center, Apr. 25, 1995.

Maziasz et al., Overview of the development of FeAl intermetallic alloys, Proceedings of the 2d International Conference on Heat-Resistant Materials, Sep. 1, 1995.

Ito et al., Blast erosion properties of overlay weld metal, Welding International, 5:3, 1991, pp. 192-197.

Horn et al., Auftragsschweißungen mit Hastelloy alloy B-42 (Overlay welding with Hastelloy B-42), Materials and Corrosion, 43:8, 1992, pp. 381-387.

Tillack, Weld fabrication of nickel-containing materials, Practical handbook of stainless steels & nickel alloys, Lamb ed., CASTI Publishing Inc., ASM International, Aug. 1999, pp. 325-370.

Insulating Method Improves Superalloy Forging, Baosteel Technical Research, Apr. 23, 2012, vol. 5, No. 4, 2 pages.

ITC-100, ITC-200, ITC-213 Ceramic Coatings, BCS International Technical Ceramics Coatings, http://budgetcastingsupply.com/ITC.php, Feb. 2013, 3 pages.

ITC-100 Base Coat, ITC-296A Top Coat, Coatings, http://budgetcastingsupply.com/ITC-Wool, 2013.

Carbon Steel, E-Z LOK, AISI 12L14 Steel, cold drawn, 19-38 mm round, Aug. 5, 2013, http://www.ezlok.com/TechnicalInfo/MPCarbonSteel.html, 1 page.

Alloy 309/309S, Specification Sheet: Alloy 309, Sandmeyer Steel Company, Aug. 5, 2013, http://www.sandmeyersteel.com/309-309S.html, 4 pages.

Shivpuri, R. and S. Kini, Lubricants and Their Applications in Forging, ASM Handbook, vol. 14A, Metalworking: Bulk Forming, Semiatin, S.L., ed., 2005, ASM International, Ohio, US, p. 84.

(56) References Cited

OTHER PUBLICATIONS

Schey et al., Laboratory Testing of Glass Lubricants, Lubrication Engineering/Tribology and Lubrication Technology, Society of Tribologists and Lubrication Engineers, US, vol. 30, No. 10, Oct. 1, 1974, pp. 489-497.

McGraw Hill Encyclopedia of Science and Technology, 1992, McGraw Hill Inc., vol. 11, pp. 32-33.

Chesney, Peter, A New Spray Coating Process for Manufacture of Stainless Steel Clad Construction Steel with Resistance to Corrosion by De-icing Salts & Seawater, Spray Forming International, Cayce, South Carolina, USA, Thermal Spray 2003: Advancing the Science and Applying the Technology, ASM International, 2003, 5 pages.

Anchor Industrial Sales, Inc. Product Data Sheets, Style #412 Fiberglass cloth, Style #412IB Fiberglass Mats, 2008, 2 pages.

"A New Nickel Superalloy", Machine Design, Hayes International Inc., published by Penton Publishing, Mar. 23, 2006, p. 41.

Crucible Compaction Metals P/M Low Carbon Astroloy, Supersolvus, printed from http://www/matweb.com/search/datasheet_print.aspx?matguld=e1bac255c1964e19a43b29 . . . On Aug. 17, 2011, 2 pages.

Gayda, John, "NASA/TM-2001-210814 High Temperature Fatigue Crack Growth Behavior of Alloy 10", Glenn Research Center, Cleveland, Ohio, National Aeronautics and Space Administration, Apr. 2001, 7 pages.

Advanced Solutions for Higher Performance and Longer Life, ATI Powder Metals Applications, printed from http://www.alleghenytechnologies.com/atipowder/applications/default.asp on Sep. 22, 2011, 4 pages.

Wlodek et al., "The Structure of Rene' 88 DT", Superalloys 1996, Eds. Kissinger et al., The Minerals, Metals & Materials Society, 1996, pp. 129-136.

Alloy: IN® 100, Centri-Vac Nickel Cobalt, 2014, MetalTek International, 1 page.

Charpy V-Notch Impact Testing, History and Process, Laboratory Testing, Inc., accessed Oct. 23, 2014, 2 pages.

Rockwell Hardness Testing, Materials Evaluation and Engineering, Inc., 2009, 2 pages.

* cited by examiner

METHODS TO IMPROVE HOT WORKABILITY OF METAL ALLOYS

TECHNICAL FIELD

The present disclosure is directed to alloy ingots and other alloy workpieces, and to methods for processing alloy ingots and other alloy workpieces.

BACKGROUND

Various alloys may be characterized as being "crack sensitive". Ingots and other workpieces composed of crack sensitive alloys may form cracks along their surfaces and/or edges during hot working operations. Forming articles from crack sensitive alloys may be problematic because, for example, cracks formed during forging or other hot working operations may need to be ground off or otherwise removed, increasing production time and expense, and reducing yield.

During certain hot working operations, such as forging and extrusion, dies apply a force to an alloy workpiece to deform the alloy workpiece. The interaction between the die's surfaces and the alloy workpiece's surfaces may involve heat transfer, friction, and wear. One conventional technique for reducing surface and edge cracking during hot working is to enclose the alloy workpiece in a metallic canister before hot working. With a cylindrical workpiece, for example, the inside diameter of the metallic canister may be slightly larger than the outside diameter of the alloy workpiece. The alloy workpiece may be inserted into the metallic canister such that the metallic canister loosely surrounds, but is not metallurgically bonded to, the alloy workpiece. The dies may contact the outer surfaces of the metallic canister. The metallic canister thermally insulates and mechanically protects the enclosed alloy workpiece, thereby eliminating or reducing the incidence of crack formation on the alloy workpiece. The metallic canister thermally insulates the alloy workpiece by action of the air gaps between the alloy workpiece and the metallic canister's inner surfaces, and also by directly inhibiting the alloy workpiece from radiating heat to the environment.

An alloy workpiece canning operation may result in various disadvantages. For example, mechanical contact between forging dies and the metallic canister's outer surfaces may break apart the metallic canister. Also, during upset-and-draw forging of a canned workpiece, the metallic canister may break apart during the draw operation, and in such case the alloy workpiece may need to be re-canned between each upset-and-draw cycle of a multiple upset-and-draw forging operation. Re-canning increases process complexity and expense. Further, a metallic canister may impair an operator from visually monitoring the surface of a canned alloy workpiece for cracks and other work-induced defects.

Given the foregoing drawbacks, it would be advantageous to provide a more efficient and/or more cost-effective method of hot working crack sensitive alloys. More generally, it would be advantageous to provide a method for improving the hot workability of alloy ingots and other alloy workpieces.

SUMMARY

Aspects according to the present disclosure are directed to methods of processing alloy ingots and other alloy workpieces to improve hot workability.

A non-limiting aspect according to the present disclosure is directed to a method of processing an alloy workpiece to reduce thermal cracking, the method comprising spraying a metallic coating material onto at least a portion of a surface of the alloy workpiece to form a surface coating metallurgically bonded to the alloy workpiece. The metallic surface coating may be more ductile than the alloy workpiece and reduces heat loss from the alloy workpiece. In certain non-limiting embodiments of the method, the alloy workpiece is rotated about a long axis of the workpiece during the spraying of the metallic coating material, which is deposited on at least a portion of a circumferential surface of the alloy workpiece.

An additional non-limiting aspect according to the present disclosure is directed to a method of processing an alloy workpiece to reduce thermal cracking, the method comprises inserting the alloy workpiece into a metallic canister. The metallic canister may have a lower coefficient of thermal expansion than the alloy and includes an inner surface comprising an nickel-boron coating on at least a portion thereof. The alloy workpiece is encapsulated in the metallic canister to form a canned assembly, and at least a portion of gas is removed from the interior of the canned assembly. The canned assembly is heated to transient liquid phase bond the alloy workpiece to the metallic canister.

Another non-limiting aspect according to the present disclosure is directed to alloy workpieces made or processed according to any of the methods of the present disclosure.

Yet another non-limiting aspect according to the present disclosure is directed to articles of manufacture made from or including alloy workpieces made or processed according to any of the methods of the present disclosure. Such articles of manufacture include, for example, jet engine components, land based turbine components, valves, engine components, shafts, and fasteners.

DESCRIPTION OF THE DRAWING FIGURES

The various non-limiting embodiments described herein may be better understood by considering the following description in conjunction with the accompanying drawing figures.

Figure 1:
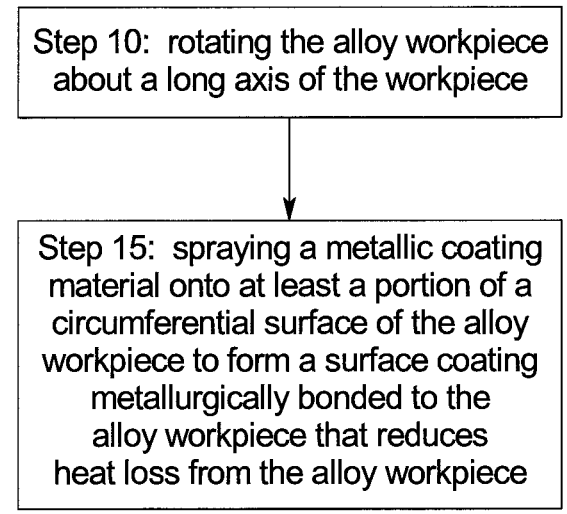
FIG. 1 is a flow diagram according to certain non-limiting embodiments of a method disclosed herein.

The reader will appreciate the foregoing details, as well as others, upon considering the following description of various non-limiting and non-exhaustive embodiments according to the present disclosure.

DESCRIPTION OF CERTAIN NON-LIMITING EMBODIMENTS

As generally used herein, the terms "consisting essentially of" and "consisting of" are embodied in the term "comprising".

As generally used herein, the articles "one", "a", "an", and "the" refer to "at least one" or "one or more", unless otherwise indicated.

As generally used herein, the terms "including" and "having" mean "comprising".

As generally used herein, the term "softening point" refers to the minimum temperature at which a particular material no longer behaves as a rigid solid and begins to sag under its own weight.

As generally used herein, the term "about" refers to an acceptable degree of error for the quantity measured, given the nature or precision of the measurement. Typical exemplary degrees of error may be within 20%, within 10%, or within 5% of a given value or range of values.

All numerical quantities stated herein are to be understood as being modified in all instances by the term "about" unless otherwise indicated. The numerical quantities disclosed herein are approximate and each numerical value is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding techniques. Notwithstanding the approximations of numerical quantities stated herein, the numerical quantities described in specific examples of actual measured values are reported as precisely as possible.

All numerical ranges stated herein include all sub-ranges subsumed therein. For example, ranges of "1 to 10" and "between 1 and 10" are intended to include all sub-ranges between and including the recited minimum value of 1 and the recited maximum value of 10. Any maximum numerical limitation recited herein is intended to include all lower numerical limitations. Any minimum numerical limitation recited herein is intended to include all higher numerical limitations.

In the following description, certain details are set forth to provide a thorough understanding of various non-limiting embodiments of the articles and methods described herein. One of ordinary skill in the art will understand that the non-limiting embodiments described herein may be practiced without these details. In other instances, well-known structures and methods associated with the articles and methods may not be shown or described in detail to avoid unnecessarily obscuring descriptions of the non-limiting embodiments described herein.

This disclosure describes various features, aspects, and advantages of various non-limiting embodiments of articles and methods. It is understood, however, that this disclosure embraces numerous alternative embodiments that may be accomplished by combining any of the various features, aspects, and advantages of the various non-limiting embodiments described herein in any combination or sub-combination that one of ordinary skill in the art may find useful.

During hot working operations, such as, for example, forging operations and extrusion operations, a force may be applied to an alloy ingot or other alloy workpiece at a temperature greater than ambient temperature, such as above the recrystallization temperature of the workpiece, to plastically deform the workpiece. The temperature of an alloy workpiece undergoing the working operation may be greater than the temperature of the dies or other structures used to mechanically apply force to the surfaces of the alloy workpiece. The alloy workpiece may form temperature gradients due to cooling of its surface by heat loss to ambient air and the thermal gradient off-set between its surfaces and the contacting dies or other structures. The temperature gradients may contribute to surface cracking of the workpiece during hot working. Surface cracking is especially problematic in situations in which the alloy workpiece is formed from a crack sensitive alloy.

According to certain non-limiting embodiments, the alloy workpiece may consist of or comprise a crack sensitive alloy. For example, various nickel base alloys, iron base alloys, nickel-iron base alloys, titanium base alloys, titanium-nickel base alloys, cobalt base alloys, and superalloys, such as nickel base superalloys, may be sensitive to cracking, especially during hot working operations. An alloy ingot or other alloy workpiece may be formed from such crack sensitive alloys and superalloys. For example, a crack sensitive alloy workpiece may be formed from alloys or superalloys selected from, but not limited to, Alloy 718 (UNS No. N07718), Alloy 720 (UNS No. N07720), Rene 41™ alloy (UNS No. N07041), Rene 88™ alloy, Waspaloy® alloy (UNS No. N07001), and Inconel® 100 alloy.

Although the methods described herein are advantageous for use in connection with crack sensitive alloys, it will be understood that the methods also are generally applicable to any alloy, including, for example, alloys characterized by a relatively low ductility at hot working temperatures, alloys hot worked at temperatures from 1000° F. to 2200° F., and alloys not generally prone to cracking. As such, as used herein, the term "alloy" includes conventional alloys and superalloys. As is understood by those having ordinary skill in the art, superalloys exhibit relatively good surface stability, corrosion and oxidation resistance, high strength, and high creep resistance at high temperatures. In various non-limiting embodiments, the alloy workpiece may comprise or be selected from an ingot, a billet, a bar, a plate, a tube, a sintered pre-form, and the like.

An alloy ingot or other alloy workpiece may be formed using, for example, conventional metallurgy techniques or powder metallurgy techniques. For example, in various non-limiting embodiments, an alloy ingot or other alloy workpiece may be formed by a combination of vacuum induction melting (VIM) and vacuum arc remelting (VAR), known as a VIM-VAR operation. In various non-limiting embodiments, an alloy workpiece may be formed by a triple melt technique, in which an electroslag remelting (ESR) operation is performed intermediate a VIM operation and a VAR operation, providing a VIM-ESR-VAR (i.e., triple melt) sequence. In other non-limiting embodiments, an alloy workpiece may be formed using a powder metallurgy operation involving atomization of molten alloy and the collection and consolidation of the resulting metallurgical powder into an alloy workpiece.

In certain non-limiting embodiments, an alloy ingot or other alloy workpiece may be formed using a spray forming operation. For example, VIM may be used to prepare a base alloy composition from a feedstock. An ESR operation may optionally be used after VIM. Molten alloy may be extracted from a VIM or ESR melt pool and atomized to form molten droplets. The molten alloy may be extracted from a melt pool using a cold wall induction guide (CIG), for example. The alloy may be deposited as molten or semi-molten material using a spray forming operation to form a solidified alloy workpiece.

In certain non-limiting embodiments, an alloy ingot or other alloy workpiece may be formed using hot isostatic pressing (HIP). HIP generally refers to the isostatic application of a high pressure and high temperature gas, such as, for example, argon, to compact and consolidate powder material into a monolithic preform. The powder may be separated from the high pressure and high temperature gas by a hermetically sealed container, which functions as a pressure barrier between the gas and the powder being compacted and consolidated. The hermetically sealed container may plastically deform to compact the powder, and the elevated temperatures may effectively sinter the individual powder particles together to form a monolithic preform. A uniform compaction pressure may be applied throughout the powder, and a homogeneous density distribution may be achieved in the preform. For example, a near-equiatomic nickel-titanium alloy powder may be loaded into a metallic container, such as, for example, a steel canister, and outgassed to remove adsorbed moisture and entrapped gas. The container containing the near-equiatomic nickel-titanium alloy powder may be hermetically sealed under vacuum, such as, for example, by welding. The sealed container may then be HIP'ed at a temperature and under a pressure sufficient to achieve full densification of the nickel-titanium alloy powder in the container, thereby forming a fully-densified near-equiatomic nickel-titanium alloy preform.

In certain non-limiting embodiments according to the present disclosure, referring to FIG. 1, a method of processing an alloy workpiece to reduce thermal cracking may generally comprise 10 rotating the alloy workpiece about a long axis of the alloy workpiece; and 15 spraying a metallic coating material onto at least a portion of a circumferential surface of the alloy workpiece to form a surface coating metallurgically bonded to the alloy workpiece that reduces heat loss from the alloy workpiece. In certain non-limiting embodiments, the alloy workpiece may be a generally cylindrical alloy workpiece, and the metallic coating may be deposited on, for example, a circumferential surface of the alloy workpiece. However, it will be understood that the alloy workpiece may have a different shape. In addition, although FIG. 1 schematically depicts an embodiment in which the alloy workpiece is rotated about an axis, it will be understood that any alternative method may be employed in which the spray device is translated relative to the alloy workpiece, or vice versa, so that the metallic coating material may be distributed about and deposited on a surface of the alloy workpiece.

In certain non-limiting embodiments, the method according to the preset disclosure may comprise spraying a metallic coating material onto at least a portion of a longitudinal end of an alloy workpiece to form a metallic surface coating metallurgically bonded to the alloy workpiece that reduces heat loss from the alloy workpiece. In certain non-limiting embodiments, the method may comprise moving the alloy workpiece along the long axis of the workpiece after completing at least one rotation of the alloy workpiece; spraying the metallic coating material on at least a subsequent portion of the outer circumferential surface of the alloy workpiece; and repeating the moving and spraying until a desired coating thickness is achieved. Again, however, it will be understood that any alternate operation may be used so that relative motion is achieved between the spray device and the alloy workpiece, so that the metallic coating material may be distributed about and deposited on a surface of the alloy workpiece.

In certain non-limiting embodiments, the material of the metallic coating may be more ductile and/or malleable than the alloy workpiece. In various non-limiting embodiments, the metallic coating formed on the alloy workpiece may be ductile over a wide temperature range, such as, for example, 68° F. to 2300° F. and 1500° F. to 2250° F. The ductility of the metallic coating and the alloy workpiece may be measured as elongation or reduction of area in a tensile test. In certain non-limiting embodiments, the metallic coating may comprise an elongation (% in 2 inch at room temperature) greater than the elongation of the alloy workpiece. In certain non-limiting embodiments, the metallic coating may comprise an elongation (% in 2 inch at room temperature) of at least 15%, at least 20%, at least 30%, at least 40%, greater than 20%, greater than 25%, greater than 30%, greater than 35, greater than 40%, greater than 45%, 15% to 45%, 20% to 40%, or 25% to 40%. In certain non-limiting embodiments, the alloy workpiece may comprise an elongation (% in 2 inch at room temperature) of up to 15%, up to 20%, or up to 30%.

In certain non-limiting embodiments, the metallic coating material may comprise a metallic material having greater toughness and/or lower hardness than the alloy of the alloy workpiece at the particular working temperature that is to be used when working the alloy workpiece. The hardness may be measured according to the Rockwell test. In certain non-limiting embodiments, the metallic coating may comprise a Rockwell hardness less than the Rockwell hardness of the alloy workpiece. In certain non-limiting embodiments, the metallic coating may comprise a Rockwell B hardness of 88 to 95, and the alloy workpiece may comprise a Rockwell B hardness of 92 to 100. In certain non-limiting embodiments, the metallic coating may comprise a Rockwell B hardness of 82 to 88, and the alloy workpiece may comprise a Rockwell B hardness of 92 to 100. In certain non-limiting embodiments, the metallic coating may comprise a Rockwell B hardness of 88, and the alloy workpiece may comprise a Rockwell B hardness of 92. In certain non-limiting embodiments, the metallic coating may comprise a Rockwell C hardness of 25, and the alloy workpiece may comprise a Rockwell C hardness of 38. The toughness of the metallic coating and the alloy workpiece may be measured by Charpy V-notch impact testing on annealed materials at room temperature. In certain non-limiting embodiments, the material of the metallic coating may comprise a Charpy V-notch impact energy greater than the Charpy V-notch impact energy of the alloy workpiece. In certain non-limiting embodiments, the metallic coating may comprise a Charpy V-notch impact energy of 65- to 80 ft-lb at 75° F.

In certain non-limiting embodiments, the metallic coating may thermally insulate the alloy workpiece's surface from the surfaces of contacting dies. In such case, the metallic coating inhibits or limits the underlying alloy workpiece from radiating heat to the environment and/or to surfaces of forging or extrusion dies contacting the coated workpiece. The thermally insulating effect of the metallic coating may prevent or inhibit the underlying alloy workpiece's surface from cooling to a brittle temperature at which the surface may more readily crack during hot working. In certain non-limiting embodiments, the metallic coating material may be more resistant to oxygen than the alloy workpiece.

In certain non-limiting embodiments, the metallic coating material may comprise metallic particles, which are sprayed onto the workpiece surface. The metallic particles may be, for example, one or more of stainless steel particles, nickel base alloy particles, iron base alloy particles, nickel-iron base alloy particles, titanium base alloy particles, and cobalt base alloy particles. In certain non-limiting embodiments, the metallic particles may be selected from stainless steel particles and nickel base alloy particles. In certain non-limiting embodiments, the stainless steel particles may comprise austenitic stainless steel particles. In certain non-limiting embodiments, the metallic coating material may comprise austenitic stainless steel particles selected from the group consisting of Type 304 stainless steel (UNS No. S30400) particles, Type 304L stainless steel (UNS No. S30403) particles, Type 316 stainless steel (UNS No. S31600) particles, and Type 316L stainless steel (UNS No. S31603) particles. In certain non-limiting embodiments, the metallic coating material may comprise nickel base alloy particles be selected from the group consisting of alloy 600 (UNS N06600) particles and alloy 625 (UNS N06625) particles.

In certain non-limiting embodiments, the metallic coating material and alloy workpiece may comprise a base metal selected from the group consisting of cobalt, iron, and nickel. In certain non-limiting embodiments, the base metal of the metallic coating material may be the same as the base metal of the alloy workpiece. For example, the metallic coating material may comprise a nickel base alloy selected from alloy 600 (UNS No. N06600) and alloy 625 (UNS No. N06625), and the alloy workpiece may comprise a nickel base alloy selected from Alloy 720 (UNS No. N07720), Rene 88™ alloy, and Waspaloy® alloy (UNS No. N07001). In certain non-limiting embodiments, the base metal of the metallic coating material and the base metal of the alloy workpiece may be different. For example, the metallic coating material may comprise an iron base alloy selected from Type 304 stainless steel (UNS S30400) and Type 316 stainless steel (UNS S31600), and the alloy workpiece may comprise a nickel base alloy selected from Alloy 720 (UNS No. N07720), Rene 88™ alloy, and Waspaloy® alloy (UNS No. N07001).

In certain non-limiting embodiments, a method of processing an alloy workpiece to reduce thermal cracking may generally comprise thermal spraying the metallic coating material onto at least a portion of a circumferential surface of the alloy workpiece to form a metallic surface coating metallurgically bonded to the alloy workpiece, wherein the metallic surface coating reduces heat loss from the alloy workpiece. In certain non-limiting embodiments, the alloy workpiece may comprise a generally cylindrical alloy workpiece. As understood by those having ordinary skill in the art, thermal spraying may comprise spraying a metallic coating material onto a surface while the metallic coating material is at a temperature greater than or equal to the melting point of the metallic coating material so that the sprayed metallic coating material comprises semi-molten metallic particles and/or molten metallic droplets. Conventional thermal spray techniques include, for example, plasma, high velocity oxygen fuel (HVOF), arc, and gas-flame thermal spray techniques. Any of the several conventional thermal spray techniques may be suitably adapted for use in methods according to the present disclosure, without undue effort.

In certain non-limiting embodiments, before thermal spraying a metallic coating material comprising semi-molten metallic particles and/or molten metallic droplets onto a surface of the alloy workpiece, at least a portion of the surface of the alloy workpiece may be heated to of at least 1100° F., such as, for example, 1100° F. to 2000° F. For example, at least a portion of a circumferential surface of a generally cylindrical alloy workpiece may be heated to a temperature greater than 2000° F., and then a metallic coating material comprising semi-molten metallic particles and/or molten metallic droplets may be thermal sprayed onto at least a portion of the heated surface of the alloy workpiece.

Figure 2:
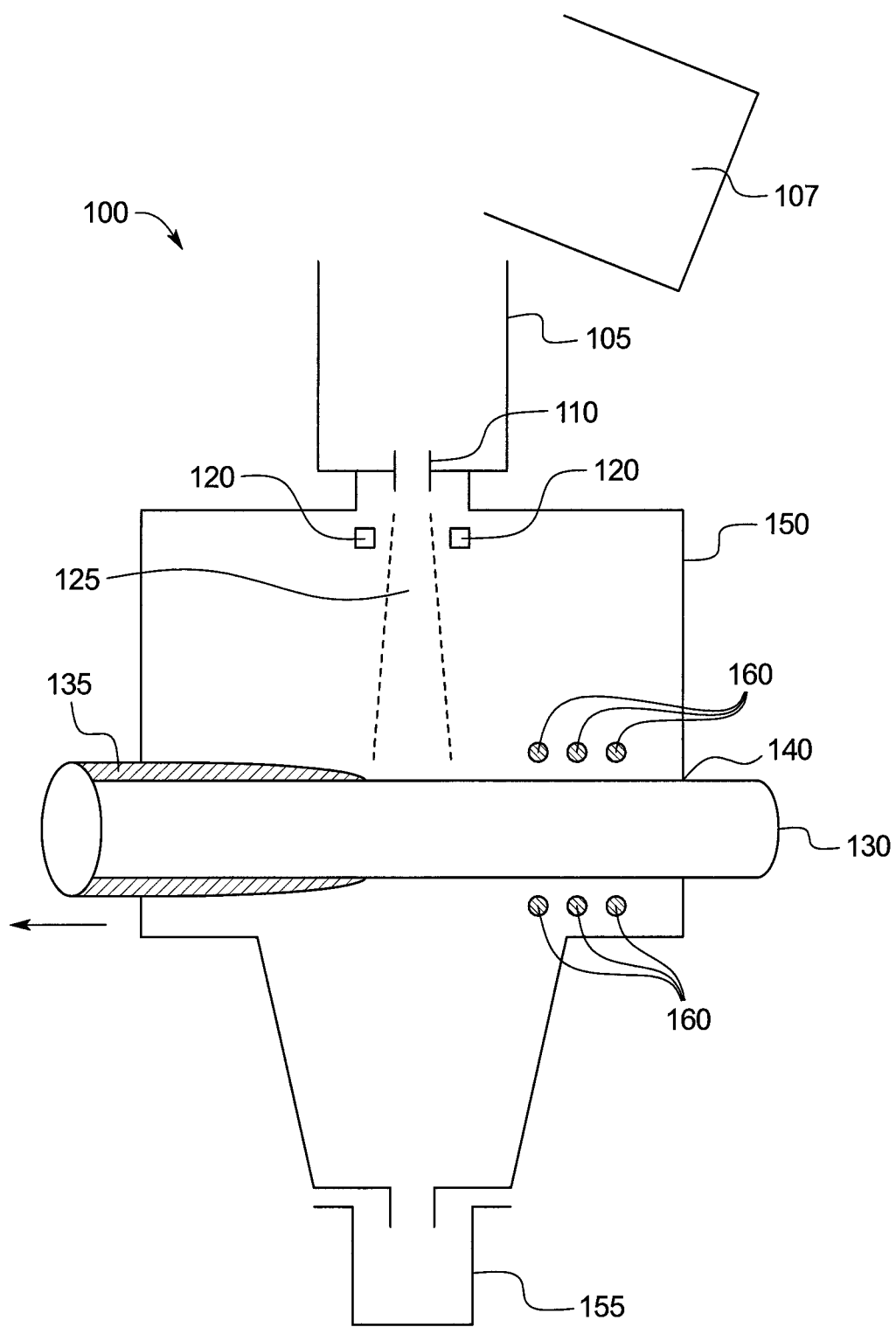
FIG. 2 is a schematic of a method of processing an alloy workpiece according to various non-limiting embodiments disclosed herein.

In certain non-limiting embodiments, referring to FIG. 2, a thermal spray system 100 may generally comprise a vessel 105, such as a tundish, for holding metallic coating material in a molten state. The vessel 105 may comprise a bottom wall having an opening to permit the molten material to flow from the vessel 105. The vessel 105 may receive the molten material from a ladle or furnace 107. A nozzle 110 may be adjacent the bottom wall of the vessel 105 to receive an exit stream of the molten metallic coating material from the opening. An atomizer 120 may be in communication with the nozzle 110 to atomize the molten metallic coating material that exits the nozzle 110. The atomizer 120 may impinge the exit stream of the molten material with a fluid stream, such as a liquid, air, or an inert gas stream, to break up the exit stream into molten droplets forming a spray cone 125. The spray comprising the spray cone 125 may be at a temperature greater than or equal to the melting point and/or softening temperature of the metallic coating material. The spray comprising the spray cone 125 may include molten material and/or semi-molten material. Alternate designs of atomizers 120 and spray systems that may be used in conjunction with this and other non-limiting embodiments described herein will be apparent to those ordinarily skilled in the art on considering this description of various embodiments of the present disclosure.

Referring to the non-limiting embodiment shown in FIG. 2, the alloy workpiece 130 may be moved and rotated parallel to the long axis of the alloy workpiece 130 through a rotating seal 140 into a spray chamber 150. An induction or resistance heating coil 160 may be positioned around the perimeter of the workpiece 130 to permit heating of a surface of the workpiece 130 and/or the spray cone 125. In certain non-limiting embodiments, the heating coil 160 may heat the workpiece surface to 1850° F. A thermal sprayed metallic surface coating 135 may be formed on at least a portion of a circumferential surface of the generally cylindrical alloy workpiece 130 by impinging the spray cone 125 on the alloy workpiece 130 and rotating the alloy workpiece 130. The alloy workpiece 130 may pass beneath and through the spray cone 125. Although FIG. 1 schematically depicts an embodiment in which the alloy workpiece is rotated about an axis, it will be understood that any alternative method may be employed in which the spray device is translated relative to the alloy workpiece, or vice versa, so that the metallic coating material may be distributed about and deposited on a surface of the alloy workpiece.

Optionally, the alloy workpiece 130 may contact one or more rollers (not shown) prior to exiting the spray chamber 150 and/or after exiting the spray chamber 150. After thermal spraying, and optionally rolling, the alloy workpiece may be removed from the spray chamber 150. Any overspray of the molten coating material may solidify as a powder to be collected in a chamber base 155 and recycled.

In certain non-limiting embodiments, a method according to the present disclosure may comprise, after thermal spraying, rolling the alloy workpiece to consolidate or densify the thermal sprayed metallic surface coating. Without wishing to be bound to any particular theory, it is believed that semi-molten metallic particles and/or molten metallic droplets may oxidize during formation and when in-flight and form pores. The resulting thermal sprayed metallic surface coating may comprise an open porosity that may interfere with subsequent hot working of the coated alloy workpiece. In certain non-limiting embodiments, the present method may comprise, after thermal spraying, rolling the alloy workpiece in the spray chamber to remove or reduce open porosity in the thermal sprayed metallic surface coating. In certain non-limiting embodiments, the method may comprise, after thermal spraying, re-heating the coated alloy workpiece and rolling the alloy workpiece to remove or reduce open porosity in the thermal sprayed metallic surface coating. In certain non-limiting embodiments, and without limitation, the rolling process may use up to 17 stands of rolls, such as, for example, 2-8 stands, and process material at rates up to 100 tons/hour. In certain other non-limiting embodiments, the method according to the present disclosure may comprise consolidating or densifying the metallic surface coating by hot isostatic pressing the coated workpiece to remove or reduce open porosity in the thermal sprayed metallic surface coating.

In certain non-limiting embodiments, the characteristics of the thermal sprayed surface coating may be related to the processing conditions, including, but not limited to temperature, pressure, stand off (distance between the spray nozzle and target surface of the alloy workpiece), spray rate, and deposition yield. In certain non-limiting embodiments, the pressure of the metallic coating material spray generated by the thermal spray device may be 1 MPa, up to 1 MPa, less than 1 MPa, 0.5 to 1 MPa, or 0.7 to 1 MPa. In certain non-limiting embodiments, the temperature of the metallic coating material spray generated by the thermal spray device may be 1000° F. to 2700° F., 1500° F. to 2500° F., or 2250° F. to 2700° F. In certain non-limiting embodiments, the spray rate of the metallic coating material generated by the thermal spray device may be 1 lb/min to 100 lb/min, 30 lb/min to 100 lb/min, 25 lb/min to 75 lb/min, or 50 lb/min. In certain non-limiting embodiments, the stand off distance between the thermal spray device and the target surface of the alloy workpiece may be 1 inch to 72 inches, 12 inches to 72 inches, 24 inches to 36 inches, 36 inches to 72 inches, or 36 inches. In certain non-limiting embodiments, the deposition yield of the thermal spray process may be up to 95%, up to 80%, up to 75%, up to 70%, 10% to 95%, 20% to 80%, 25% to 75%, 30% to 60%, or 50%. As generally used herein, the term "deposition yield" refers to the percentage of thermal sprayed metallic coating material that adheres to the alloy workpiece.

In certain non-limiting embodiments, the thickness of a thermal sprayed metallic surface coating on an alloy workpiece may be up to 2 inches, up to 1 inch, up to 0.5 inch, up to 0.25 inch, 0.25 to 2 inches, 0.5 to 1 inch, or 1 to 2 inches. In certain non-limiting embodiments, the thermal sprayed metallic surface coating, after rolling, may have a thickness from up to 2 inches, up to 1 inch, up to 0.5 inch, up to 0.25 inch, 0.25 to 2 inches, 0.5 to 1 inch, 1 to 2 inches, 0.25 to 0.5 inch, 0.1 to 0.5 inch, or 0.1 to 0.25 inch. In certain non-limiting embodiments, the thickness of a thermal sprayed metallic surface may be related to the traverse speed and/or rotational speed of the alloy workpiece.

In certain non-limiting embodiments, a method of processing an alloy workpiece to reduce thermal cracking may generally comprise cold spraying the metallic coating material onto at least a portion of a surface of the alloy workpiece to form a metallic surface coating metallurgically bonded to the alloy workpiece, wherein the metallic surface coating reduces heat loss from the alloy workpiece. In certain non-limiting embodiments, the alloy workpiece may be a generally cylindrical alloy workpiece, and the metallic coating may be deposited on, for example, a circumferential surface of the alloy workpiece. However, it will be understood that the alloy workpiece may have a different shape. As understood by those having ordinary skill in the art, cold spraying may comprise spraying a metallic coating material onto a surface while the metallic coating material is at a temperature below the melting point of the metallic coating material, so that the sprayed metallic coating material comprises solid particles of the metallic coating material.

Figure 3:
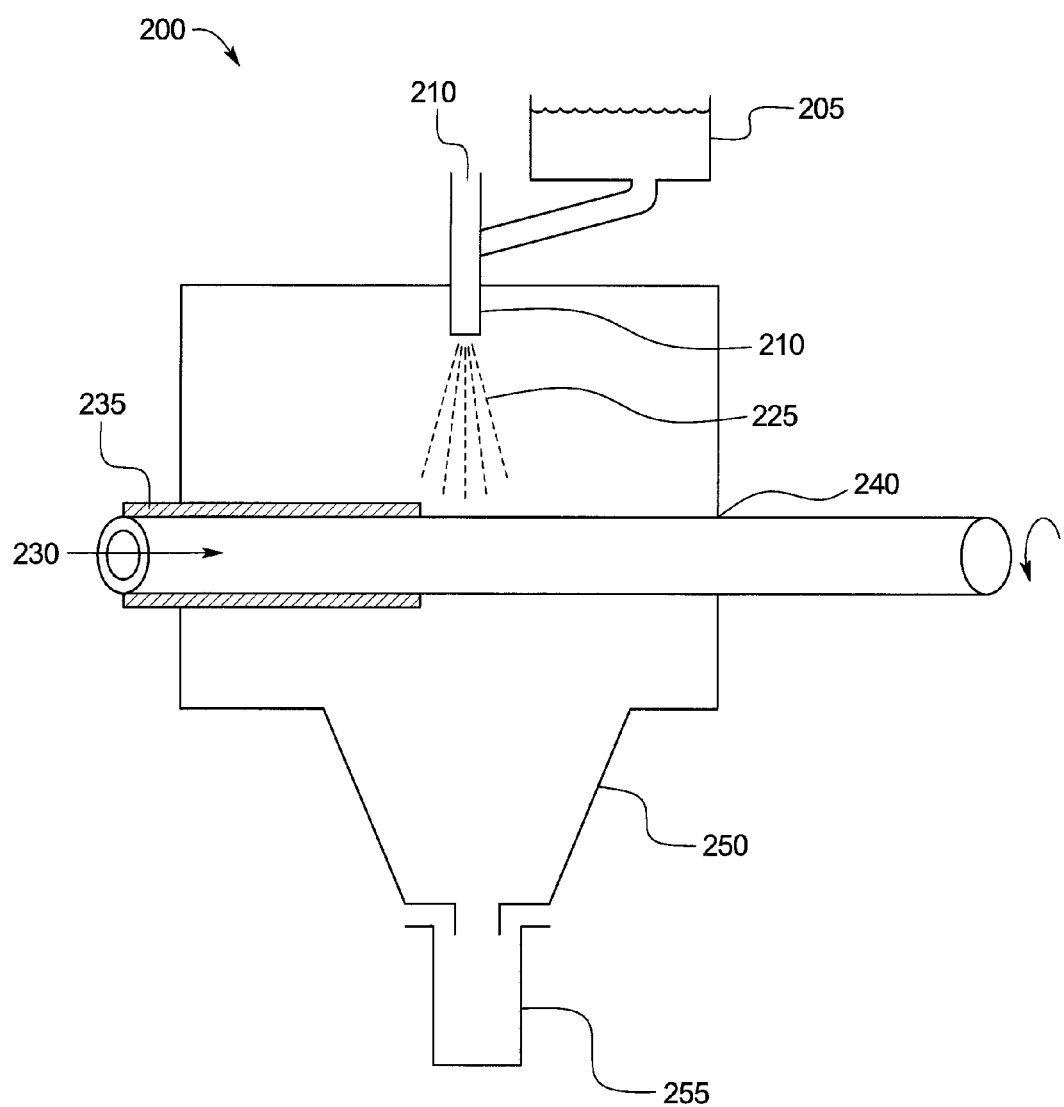
FIG. 3 is a schematic of a method of processing an alloy workpiece according to various non-limiting embodiments disclosed herein.

In certain non-limiting embodiments, referring to FIG. 3, a cold spray system 200 may generally comprise a vessel 205 for holding the solid particulate metallic coating material. The vessel 205 may comprise a bottom wall having an opening to permit the solid particulate material to flow from the vessel 205. A nozzle 210, such as a converging-diverging (Laval) type nozzle, may be in communication with the vessel 205 to receive the solid particulate material from the opening. The nozzle 210 may accelerate a fluid stream, such air, nitrogen, helium, argon or mixtures thereof, to a supersonic speed. The solid particulate material may be fed from the vessel 205 into the fluid stream to become entrained in the flow and accelerated to high velocities, forming a spray cone 225. The solid particulate material may be fed from the vessel 205 into the fluid stream upstream from the nozzle 210 or at the exit of the nozzle 210. The fluid stream may be heated to a temperature less than the melting point and/or softening temperature of the solid particulate material. In certain non-limiting embodiments, the fluid stream may not be heated prior to entry to the nozzle 210 when the solid particulate material achieves sufficient velocity to plastically deform upon impact with the workpiece 230. Suitable nozzles and cold spray devices that may be used in conjunction with this and other non-limiting embodiments described herein will be apparent to those having ordinary skill in the art on considering the present description of embodiments of the invention.

Referring to the non-limiting embodiment shown in FIG. 3, the alloy workpiece 230 may be moved and rotated parallel to a long axis of the alloy workpiece 230 through a rotating seal 240 into a spray chamber 250. A cold sprayed surface coating 235 may be formed on at least a portion of a circumferential surface of the alloy workpiece 230 by impinging the spray cone 225 on the alloy workpiece 230 and rotating the alloy workpiece 230. The alloy workpiece 230 may pass beneath and through the spray cone 225. Any overspray of the solid metallic coating material may be collected in a chamber base 255 and recycled. Although FIG. 3 schematically depicts an embodiment in which the alloy workpiece is rotated about an axis, it will be understood that any alternative method may be employed in which the spray device is translated relative to the alloy workpiece, or vice versa, so that the metallic coating material may be distributed about and deposited on a surface of the alloy workpiece.

Cold spraying may be carried out at relatively low temperatures, below the melting point of the particulate metallic coating material and the alloy workpiece. The relatively low temperatures may prevent high temperature oxidation, evaporation, melting, recrystallization and/or gas evolution of the metallic coating material, which may provide an advantage over thermal spray coating methods. In certain non-limiting embodiments, the original structure and properties of the solid metallic coating material may be preserved when deposited as a coating on the alloy workpiece, without phase transformations that might otherwise be associated with high temperature coating processes, such as, for example, plasma, HVOF, arc, gas-flame spraying or other thermal spraying processes. Without wishing to be bound to any particular theory, it is believed that the cold sprayed coating material may not oxidize during flight and may provide a metallic coating on the alloy workpiece having higher density and/or lower thermal conductivity than various thermal sprayed coatings.

The underlying principles, apparatus and methodology of cold spraying are generally described, for example, in U.S. Pat. No. 5,302,414. Without wishing to be bound to any particular theory, it is believed that a cold spray surface coating may be formed as a result of particle impingement on the workpiece's surface. The impact of the solid metallic particles on the alloy workpiece may plastically deform the solid metallic particles. The shearing at the particle/particle interface and/or particle/workpiece interface may break down surface oxide films on the particles and/or alloy workpiece, thereby initiating metal-on-metal contact and the formation of strong, metallurgical bonds between individual metallic coating particles, and between the metallic coating particles and the alloy workpiece surface. Bonding in cold spray processes may be dependent on the process of particle deformation and, therefore, hard, brittle materials may not be conducive to cold spraying due to their limited ability to plastically deform.

In certain non-limiting embodiments, the characteristics of the cold sprayed surface coating may be related to the processing conditions, including, but not limited to temperature, pressure, traverse speed of the alloy workpiece, stand off (distance between the nozzle and surface of the alloy workpiece), spray rate, and deposition yield. In certain non-limiting embodiments, the pressure of the spray generated by the cold spray device may be 0.5 to 5 MPa, 0.7 to 5 MPa, 1 to 5 MPa, 1 to 4 MPa, 0.3 to 1 MPa, 0.5 to 1 MPa, or 0.7 to 1 MPa. In certain non-limiting embodiments, the temperature of spray generated by the cold spray device may be 100 to 1000° C., 100 to 600° C., 250 to 600° C., 300 to 1000° C., 400 to 600° C., 500 to 1000° C., or 500 to 800° C. In certain non-limiting embodiments, the spray rate of the cold spray device may be 1 to 200 g/min, 10 to 100 g/min, or 0.1 to 1 g/min. In certain non-limiting embodiments, the stand off distance between the cold spray device and the target surface of the alloy workpiece may be 1 to 72 inches, 12 to 72 inches, 24 to 36 inches, 36 to 72 inches, or 36 inches. In certain non-limiting embodiments, the deposition yield of the cold spray process may be up to 95%, up to 80%, up to 75%, up to 70%, 10% to 95%, 20% to 80%, 25% to 75%, 30% to 60%, or 50%.

In certain non-limiting embodiments, the thickness of a cold spray surface coating may be up to 2 inches, up to 1 inch, up to 0.5 inches, up to 0.25 inches, 0.25 inches to 2 inches, 0.5 inches to 1 inch, 1 inch to 2 inches. In certain non-limiting embodiments, the thickness of a thermal sprayed metallic surface may be related to the traverse speed and/or rotational speed of the alloy workpiece.

In certain non-limiting embodiments according to the present disclosure, after a surface coating is deposited onto a region of a circumferential or other surface of the alloy workpiece, the alloy workpiece may be re-positioned to move the deposited surface coating and the corresponding region of the surface away from the spray cone and to move a second or subsequent region of the surface toward the spray cone. After the alloy workpiece is re-positioned, a metallic surface coating may be cold sprayed onto the surface of the alloy workpiece by moving the alloy workpiece in a direction parallel to the long axis of the alloy workpiece to contact the spray cone. In other words, the spray cone may be stationary while the alloy workpiece is moved parallel to the long axis of the alloy workpiece and a subsequent region of the surface of the alloy workpiece passes beneath the spray cone.

The relative re-positioning of the alloy workpiece and the depositing of the metallic surface coating on, for example, a circumferential surface of a generally cylindrical alloy workpiece in directions parallel to a long axis of the alloy workpiece may be successively repeated until the circumferential surface of the alloy workpiece is substantially covered with a metallic coating. In certain non-limiting embodiments, the spraying parameters and alloy workpiece positioning may be predetermined and/or actively controlled to form a uniform surface coating over at least a portion of the circumferential surface of the alloy workpiece.

The temperature range over which alloys may be hot worked may take into account the temperature at which cracks initiate in the alloy and the composition and form of the metallic coating material deposited by methods according to the present disclosure. At a given starting temperature for a hot working operation, some alloys may be effectively hot worked over a larger temperature range than other alloys because of differences in the temperature at which cracks initiate in the alloy. For alloys having a relatively small hot working temperature range (i.e., the difference between the lowest temperature at which the alloy may be hot worked and the temperature at which cracks initiate), the thickness of the metallic surface coating may be relatively greater to inhibit or prevent the underlying workpiece from cooling to a brittle temperature range in which cracks initiate. Likewise, for alloys having a relatively large hot working temperature range, the thickness of the metallic surface coating may be relatively smaller to inhibit or prevent the underlying alloy ingot or other alloy workpiece from cooling to a brittle temperature range in which cracks initiate.

In certain non-limiting embodiments, the metallic surface coating may be formed on at least a portion of the surface of the alloy workpiece. In certain non-limiting embodiments, the metallic surface coating may be formed on a substantial portion of the surface of the workpiece. In certain non-limiting embodiments, the metallic surface coating may be formed on a circumferential surface of the alloy workpiece. In certain non-limiting embodiments, the metallic surface coating may be formed on a circumferential surface of the workpiece and at least one lateral face or end face of the workpiece. In certain non-limiting embodiments, the metallic surface coating may be formed on a circumferential surface of the workpiece and each lateral face or end face of the workpiece The metallic surface coating provided on an alloy workpiece according to methods disclosed herein may be deposited to a thickness sufficient to thermally insulate the underlying workpiece surface from a surface of a contacting die, thereby inhibiting or preventing the underlying workpiece surface from cooling to a temperature at which the underlying workpiece surface may more readily crack during hot working. In this manner, greater hot working temperatures may generally correlate with a preference for greater metallic surface coating thicknesses. In certain non-limiting embodiments, the metallic surface coating may have a thickness suitable to reduce heat loss from the workpiece. Without intending to be bound to any particular theory, the metallic surface coating may reduce heat loss of the alloy workpiece and/or increase slippage of the workpiece relative to the die or other contacting surfaces during hot working. The metallic surface coating may act as a thermal barrier to heat loss from the workpiece through convection, conduction, and/or radiation.

According to certain non-limiting embodiments, a method of processing an alloy ingot or other alloy workpiece to reduce thermal cracking may generally comprise cooling the alloy workpiece including the metallic surface coating prior to working the alloy workpiece. Cooling the alloy workpiece may comprise cooling the metallic surface coating. In certain non-limiting embodiments, cooling the alloy workpiece may comprise air cooling the alloy workpiece. In certain non-limiting embodiments, the surface of the alloy workpiece may be cooled to room temperature prior to working the alloy workpiece.

Figure 4:
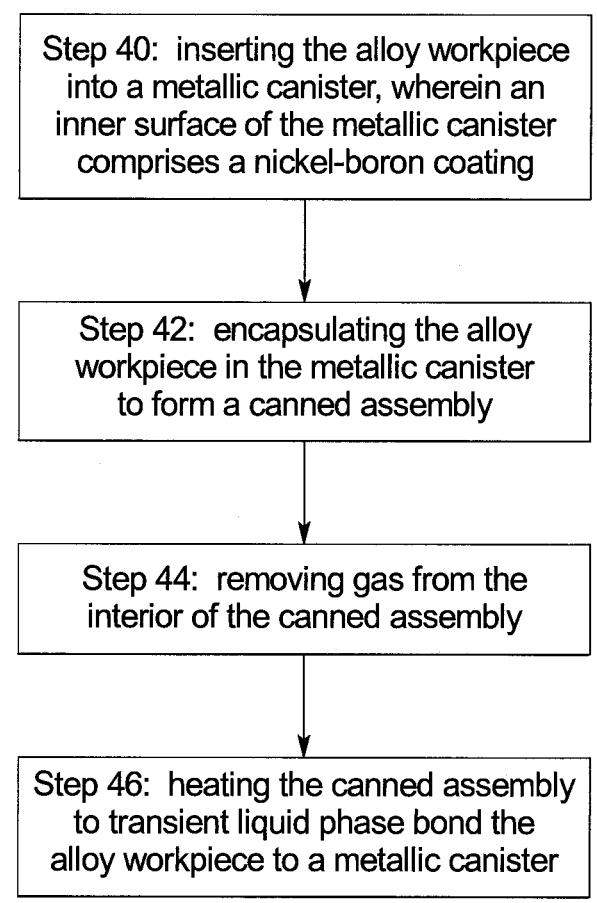
FIG. 4 is a flow diagram according to certain non-limiting embodiments of a method disclosed herein.

In certain non-limiting embodiments, referring to FIG. 4, an additional method of processing an alloy workpiece according to the present disclosure to reduce thermal cracking generally comprises 40 inserting the alloy workpiece into a metallic canister. At least a portion of an inner surface of the metallic canister comprises a nickel-boron coating. The alloy workpiece is encapsulated 42 in the metallic canister to form a canned assembly. At least a portion of gas is removed 44 from the interior of the canned assembly, and the canned assembly is heated 46 to transient liquid phase bond the alloy workpiece to the metallic canister. In certain non-limiting embodiments, the metallic canister may comprise a metallic cover. For example, the metallic cover may be welded or otherwise securely attached to an open end of the metallic canister to enclose the alloy workpiece in the metallic canister and thereby form a canned assembly. In various non-limiting embodiments of the method, an outlet may be provided in one of the metallic canister and metal cover, and the canned assembly may be sealed expect for the outlet. Gas may be drawn out of the interior of the canned assembly by establishing a vacuum on the outlet.

In certain non-limiting embodiments, the nickel-boron coating may metallurgically bond the alloy workpiece to the metallic canister during heating of the canned assembly. Accordingly, in certain non-limiting embodiments, the metallic canister may be referred to or considered to be a surface coating metallurgically bonded to the alloy workpiece.

In certain non-limiting embodiments, the metallic canister may comprise a generally cylindrical metallic portion having an open end and a metallic cover that may be welded or otherwise attached to the open end of the metallic portion and thereby encapsulate an alloy workpiece therein. In certain non-limiting embodiments, the metallic canister may comprise a wall thickness from 0.25 to 1 inch, such as, for example, 0.25 to 0.75 inches or greater than 0.25 to 0.5 inches. In certain non-limiting embodiments, the metallic canister may comprise an internal diameter that is larger than an outer diameter of the alloy workpiece so that the alloy workpiece may be disposed in the canister. In certain non-limiting embodiments, the metallic canister may comprise a larger internal diameter at the open end of the canister relative to the internal diameter at the closed end. In certain non-limiting embodiments, the canned assembly may comprise a gap between the alloy workpiece and metallic canister. In certain other non-limiting embodiments, the canned assembly may lack a gap between the alloy workpiece and metallic canister. In certain non-limiting embodiments, the alloy workpiece may be inserted into the metallic canister to contact the metallic canister under the effect of gravity. In certain non-limiting embodiments, the alloy workpiece may contact the metallic canister, including the nickel-boron coating therein, during transient liquid phase bonding and/or homogenization.

In certain non-limiting embodiments, the alloy workpiece and/or metallic canister may be tapered. The tapered metallic canister may be formed by cold forming and welding a metal sheet to fit the tapered alloy workpiece. In certain non-limiting embodiments, the tapered alloy workpiece and tapered metallic canister may each comprise a wide end and a narrow end. In certain non-limiting embodiments, the narrow end may comprise a bottom end and the wide end may comprise a top end. In certain non-limiting embodiments, the tapered alloy workpiece and tapered metallic canister may comprise a taper of 1:50 to 1:200, 1:50 to 1:100, 1:200, 1:100, or 1:50. In certain non-limiting embodiments, the alloy workpiece may comprise a tapered, cylindrical outer surface, and the metallic canister may comprise a complementary tapered, cylindrical inner surface. In certain non-limiting embodiments, the complementary geometry of the tapered surfaces may provide close contact between the alloy workpiece and metallic canister, including the nickel-boron coating. In certain non-limiting embodiments, the alloy workpiece may be tapered along the entire length of the long axis of the alloy workpiece. Without wishing to be bound to any particular theory, it is believed that utilizing a tapered workpiece and a tapered metallic canister having complementary geometries may improve contact between the alloy workpiece and the metallic canister, including the nickel-boron coating, relative to an untapered alloy workpiece and/or untapered metallic canister.

In certain non-limiting embodiments, the metallic canister may comprise a material having a lower coefficient of thermal expansion than the alloy workpiece. For example, austenitic stainless steel may have a thermal expansion coefficient about 30% greater than carbon steel. In certain non-limiting embodiments, the coefficient of thermal expansion of the metallic canister may be at least 20% less than the coefficient of thermal expansion of the alloy workpiece over a broad temperature range, such as, for example, from 68° F. to 2000° F. Without wishing to be bound to any particular theory, it is believed that providing such a difference in thermal expansion properties between the alloy workpiece and metallic canister may generate compressive stress to maintain contact between the alloy workpiece and the metallic canister, including the nickel-boron coating, during heating of the canned assembly and transient liquid phase bonding. In certain non-limiting embodiments, the metallic canister material may comprise a coefficient of thermal expansion of $6.9 \times 10^{-6}$ in/in·° F. at 70-200° F. (12.4 µm/m·° C. at 21-93° C.). In certain non-limiting embodiments, the metallic canister material may comprise a coefficient of thermal expansion of $9.2 \times 10^{-6}$ in/in·° F. at 70-200° F. (16.5 µm/m·° C. at 21-93° C.). In certain non-limiting embodiments, the alloy workpiece may comprise a coefficient of thermal expansion of $6.8 \times 10^{-6}$ in/in·° F. at 70-200° F. (12.2 µm/m·° C. at 21-93° C.).

In certain non-limiting embodiments, the metallic canister may comprise a material selected from a nickel base alloy, an iron base alloy, a nickel-iron base alloy, a cobalt base alloy, and a stainless steel. The iron base alloy canister may comprise Alloy 902 (UNS No. N09902). In certain non-limiting embodiments, the metallic canister may comprise a Type 430 stainless steel (UNS No. S43000).

In certain non-limiting embodiments, the alloy workpiece and the metallic canister may comprise a base metal selected from the group consisting of cobalt, iron, and nickel. In certain non-limiting embodiments, the base metal of the metallic canister and the base metal of the alloy workpiece may be different. For example, the metallic canister may comprise an iron-base alloy selected from Alloy 902 (UNS No. N09902) and Type 430 stainless steel (UNS No. S43000), while the alloy workpiece may comprise a nickel-base alloy selected from Alloy 720 (UNS No. N07720), Rene 88™ alloy, and Waspaloy® alloy (UNS No. N07001).

In certain non-limiting embodiments, the method may comprise, prior to inserting the alloy workpiece into the metallic canister, depositing a nickel-boron coating onto at least a portion of an inner surface of the metallic canister. In certain non-limiting embodiments, the nickel-boron coating may be applied to the inner surface of the metallic canister by electroless plating. As known to those having ordinary skill in the art, electroless plating may deposit material onto a surface without the use of an electric current. Generally, electroless plating includes catalytic reduction of one or more metal ions in a solution to deposit the metal on a surface without use of electrical energy. The driving force for the deposition process may be provided by a chemical reducing agent in the solution. A variety of suitable electroless plating processes may be used to deposit the nickel-boron coating onto the inner surface of the metallic canister, and those having ordinary skill in the art will be able to readily adapt conventional electroless plating techniques to provide a suitable nickel-boron coating on an interior surface of a metallic canister in connection with the present methods.

In certain non-limiting embodiments, depositing a nickel-boron coating onto at least a portion of an inner surface of a metallic canister may generally comprise: disposing a plating solution comprising a nickel-boron material in the interior of a metallic canister; plating the nickel-boron material onto at least a portion of the inner surface of the metallic canister; draining the plating solution from the metallic canister, such as through an outlet; rinsing the metallic canister; and drying the metallic canister, such as, for example, by heating the metallic canister. The process provides an inner surface of the metallic canister with a nickel-boron coating. During the plating process, the temperature and pH of the plating solution may be monitored and controlled. In certain non-limiting embodiments, the plating solution may be held at a constant temperature. In certain non-limiting embodiments, the plating solution may initially be heated to initiate the catalytic plating process. In certain non-limiting embodiments, the plating time may be selected to produce a coating with a certain desired thickness.

In certain non-limiting embodiments, the plating solution may comprise a solvent, a reducing agent, and ions of one or more metals to be plated onto the inner surface of the metallic canister. The solvent may comprise water and/or alcohol, such as, for example, methanol and/or ethanol. The metal ions may be provided using, for example, a metal salt that is at least partially soluble in the solvent. In certain non-limiting embodiments, the metal salt may comprise nickel chlorides, nickel sulfates, nickel formates, nickel acetates, and/or any other suitable nickel salt that is soluble in the solution. In certain non-limiting embodiments, the salt may be selected such that the salt anions will not interfere with the electroless plating process or will not produce undesired coating properties. In certain non-limiting embodiments, the reducing agent may comprise one or more of N-dimethylamine borane, H-diethylamine borane, and sodium borohydride.

In certain non-limiting embodiments, the plating solution may comprise one or more additives to control the pH of the solution, to stabilize metal ions, to prevent precipitation of metal salts, to control the free metal ion concentration, and/or to control certain physical properties of the coating. In certain non-limiting embodiments, the plating solution may comprise an acid and/or base to control the solution pH. In certain non-limiting embodiments, the plating solution may comprise a complexing agent, such as an acid, for example, to control the free nickel ion concentration of a plating solution.

In certain non-limiting embodiments, the plating solution may comprise solid lubricants and/or hard particles to produce certain physical properties. For example, the solid lubricants and/or hard particles may be selected to produce a coating having a certain coefficient of friction or resistance to wear. In certain non-limiting embodiments, the solid lubricant may be selected from polytetrafluoroethylene, graphite, and molybdenum sulfide. In certain non-limiting embodiments, the plating solution comprises hard particles selected from carbide (e.g., silicon carbide and/or chromium carbide), nitrides, borides, diamond, and/or oxides. In certain non-limiting embodiments, the solid lubricants and/or hard particles may comprise a powder suspended in a plating solution. During a deposition process, some of the suspended material may be incorporated into the resulting coating, thereby producing desired physical properties. In certain non-limiting embodiments, the solid lubricant and/or hard particles may individually comprise up to 20% by volume of the coating. In certain non-limiting embodiments, the nickel-boron coating may have a hardness and/or wear resistance that is greater than a hardness or wear resistance of the alloy workpiece.

In certain non-limiting embodiments, the nickel-boron coating may comprise nickel and 1 to 10 weight percent boron, such as, for example, 2 to 7 weight percent boron, or 3 to 5 weight percent boron. In certain non-limiting embodiments, the nickel-boron coating may comprise nickel and 3 to 5 weight percent boron. Nickel-boron coatings also may comprise incidental impurities. In certain non-limiting embodiments, the nickel-boron coating consists of or consists essentially of 1 to 10 weight percent boron, 2 to 7 weight percent boron, or 3 to 5 weight percent boron, nickel, and incidental impurities.

In certain non-limiting embodiments, the nickel-boron coating may comprise a thickness from 0.005 inches to 0.25 inches, such as, for example, 0.005 inches to 0.1 inches or 0.005 inches to 0.01 inches.

In certain non-limiting embodiments, before depositing the nickel-boron coating, the metallic canister may be surface conditioned, for example, by grinding or peeling the inner surface of the metallic canister. In various non-limiting method embodiments, the metallic canister may be sanded and/or buffed. In certain non-limiting embodiments, the metallic canister may be surface ground to #3 to #4 finish to improve bonding of the nickel-boron coating to the inner surface of the canister.

In certain non-limiting embodiments, the nickel-boron coating may be applied to the metallic canister by one of thermal spraying and cold spraying, as described above. In certain non-limiting embodiments utilizing thermal spraying to apply a nickel-boron coating to an interior wall of the canister, the molten metallic coating material may comprise a nickel-boron alloy. In certain non-limiting embodiments utilizing cold spraying to apply a nickel-boron coating to an interior wall of the canister, the solid metallic particles of the metallic coating material may comprise nickel-boron alloy particles. In certain non-limiting embodiments, the nickel-boron alloy applied by thermal spraying or cold spraying may comprise a nickel base alloy or borated stainless steel comprising up to 3 weight percent boron. In certain non-limiting embodiments, the nickel-boron alloy applied by thermal spraying or cold spraying may comprise Type 304B7 stainless steel (UNS No. S30467) comprising 1.75 to 2.25 weight percent boron.

In certain non-limiting embodiments, after forming the nickel-boron coating on at least a portion of an inner surface of the metallic canister, but before inserting the alloy workpiece, the metallic canister may be heated. For example, in various embodiments, the metallic canister may be exposed to high temperatures, such as, for example, 1100° F. to 2500° F., to expand the metallic canister, and the alloy workpiece may be inserted into the expanded metallic canister. The metallic canister may contract when the metallic canister cools, such that the nickel-boron coating may be drawn into tight contact with the alloy workpiece.

In certain non-limiting embodiments, the present method may comprise removing gas from the interior of the canned assembly by connecting an outlet provided on the canister to a vacuum pump and applying a vacuum to remove at least a portion of gas and/or moisture from the interior of the canned assembly. In certain non-limiting embodiments, the vacuum may generate air compression pressure to maintain contact between the alloy workpiece and metallic canister during transient liquid phase bonding and/or homogenization. Without wishing to be bound to any particular theory, it is believed that heating the canned assembly may generate gas in the interior of the canned assembly that may adversely affect transient liquid phase bond formation and/or metallurgical bond formation. In certain non-limiting embodiments, the method may comprise simultaneously applying a vacuum to remove gas and/or moisture from the interior of the canned assembly and heating the canned assembly to a transient liquid phase bond temperature and/or homogenization temperature.

In certain non-limiting embodiments, heating the canned assembly to transient liquid phase bond the alloy workpiece to the metallic canister may comprise placing the canned assembly into a furnace or oven. In certain non-limiting embodiments, the canned assembly may be heated to at least one of a transient liquid phase bonding temperature and a homogenization temperature. In certain non-limiting embodiments, the transient liquid phase bonding temperature may be less than or equal to the homogenization temperature. In certain non-limiting embodiments, the transient liquid phase bonding temperature may be equal to or greater than a melting temperature of the nickel-boron coating. In certain non-limiting embodiments, the melting temperature of the nickel-boron coating may be less than or equal to the homogenization temperature. In certain non-limiting embodiments, the homogenization temperature may be from 2100° F. to 2200° F. In certain non-limiting embodiments, the transient liquid phase bonding temperature may be from 1800° F. to 2000° F. In certain non-limiting embodiments, the melting temperature of the nickel-boron coating may be from 1850° F. to 1930° F.

In certain non-limiting embodiments, transient liquid phase bonding and homogenization may occur simultaneously. For example, in certain non-limiting embodiments, the transient liquid phase bonding temperature may overlap with the homogenization temperature. Without wishing to be bound to any particular theory, it is believe that during transient liquid phase bonding and/or homogenization, the nickel-boron coating may melt and boron may diffuse into both the alloy workpiece and metallic canister. As the boron diffuses from the nickel-boron coating, the melting point of the nickel-boron coating may increase. When the nickel-boron coating re-solidifies, a metallurgical bond may form that welds the alloy workpiece to the inner surface of the metallic canister, thereby resulting in transient liquid phase bonding. In certain non-limiting embodiments, transient liquid phase bonding may occur prior to homogenization.

In certain non-limiting embodiments, the canned assembly may be heated to a transient liquid phase bonding temperature for a first period of time and a homogenization temperature for a second period of time. In certain non-limiting embodiments, the first period of time and second period of time may be independently selected from up to 72 hours, up to 48 hours, up to 36 hours, up to 24 hours, up to 12 hours, up to 5 hours, up to 4 hours, and up to 2 hours, such as, for example, 24 to 72 hours, 36 to 48 hours, 6 to 24 hours, 1 to 5 hours, 2 to 4 hours, or 2 to 3 hours. In certain non-limiting embodiments, the first period of time may be up to 5 hours, such as, for example, up to 4 hours, up to 2 hours, 1 to 5 hours, 2 to 4 hours, or 2 to 3 hours. In certain non-limiting embodiments, the second period of time may be up to 72 hours, such as, for example, up to 48 hours, up to 36 hours, up to 24 hours, up to 12 hours, 24 to 72 hours, 36 to 48 hours, or 6 to 24 hours. In certain non-limiting embodiments, the canned assembly may be heated to a temperature from 1850° F. to 1930° F. for up to two hours to melt the nickel-boron coating and result in transient liquid phase bonding between the alloy workpiece and metallic canister, prior to heating the canned assembly to a homogenization temperature from 2100° F. to 2200° F. for 36 to 72 hours.

In certain non-limiting embodiments, the canned assembly may be heated to produce transient liquid phase bonding between the alloy workpiece and the metallic canister by applying a first temperature gradient, and then heating to homogenize the alloy workpiece by applying a second temperature gradient. In certain non-limiting embodiments, the first temperature gradient may be at least 0.50° F./min, such as, for example, at least 0.75° F./min, at least 1° F./min, at least 2° F./min, up to 3° F./min, up to 2° F./min, up to 1.5° F./min, up to 1° F./min, 0.5 to 2° F./min, or 0.6 to 1.75° F./min. In certain non-limiting embodiments, the first temperature gradient may be at a rate sufficient to increase the temperature from 1850° F. to 1930° F. over a time of up to two hours. In certain non-limiting embodiments, the first temperature gradient may be at least 0.10° F./min, such as, for example, at least 0.2° F./min, at least 0.5° F./min, at least 0.75° F./min, up to 1° F./min, up to 1° F./min, up to 0.9° F./min, up to 0.75° F./min, 0.1 to 0.9° F./min, or 0.2 to 0.5° F./min. In certain non-limiting embodiments, the second temperature gradient may be at a rate sufficient to increase the temperature from 2100° F. to 2200° F. over 36 to 48 hours. Without wishing to be bound to any particular theory, it is believed that slowing down the temperature gradient near the melting point of the nickel-boron coating and/or holding at the melting point of the nickel-boron coating may reduce or prevent long-range migration of the melted nickel-boron coating and provide a stronger metallurgical bond between the alloy workpiece and the metallic canister. In certain non-limiting embodiments, heating may be slowed from 1850° F. to 1930° F. and held for 1 to 2 hours from 1900° F. to 1930° F.

In contrast to the canning method described herein, a conventional canning technique may be characterized by lower protection efficiency because the metal can is not metallurgically bonded to the workpiece. Without wishing to be bound to any particular theory, it is believed that a transient liquid phase bond between the metallic canister and the alloy workpiece may survive heavy hot working to effectively protect the workpiece from surface cracking due to die chilling effects, and thereby improve forging yield. For example, the present inventors have observed that a transient liquid phase bond produced according to the present method survived under very tough rolling conditions. The nickel-boron surface coating may metallurgically bond to the surface of the alloy workpiece and the metallic canister may be retained on the surface of the alloy workpiece up to and during hot working. The metallic canister bonded to the alloy workpiece may reduce heat loss from the alloy workpiece and eliminate or reduce the incidence of surface cracking during forging, extrusion, or other working of the alloy workpiece relative to an otherwise identical alloy workpiece lacking such bonded canister. The metallic canister may remain metallurgically bonded to the alloy workpiece after rotary forging to produce forged bar and billet products and/or after rolling to produce bar and coil products.

Figure 5:
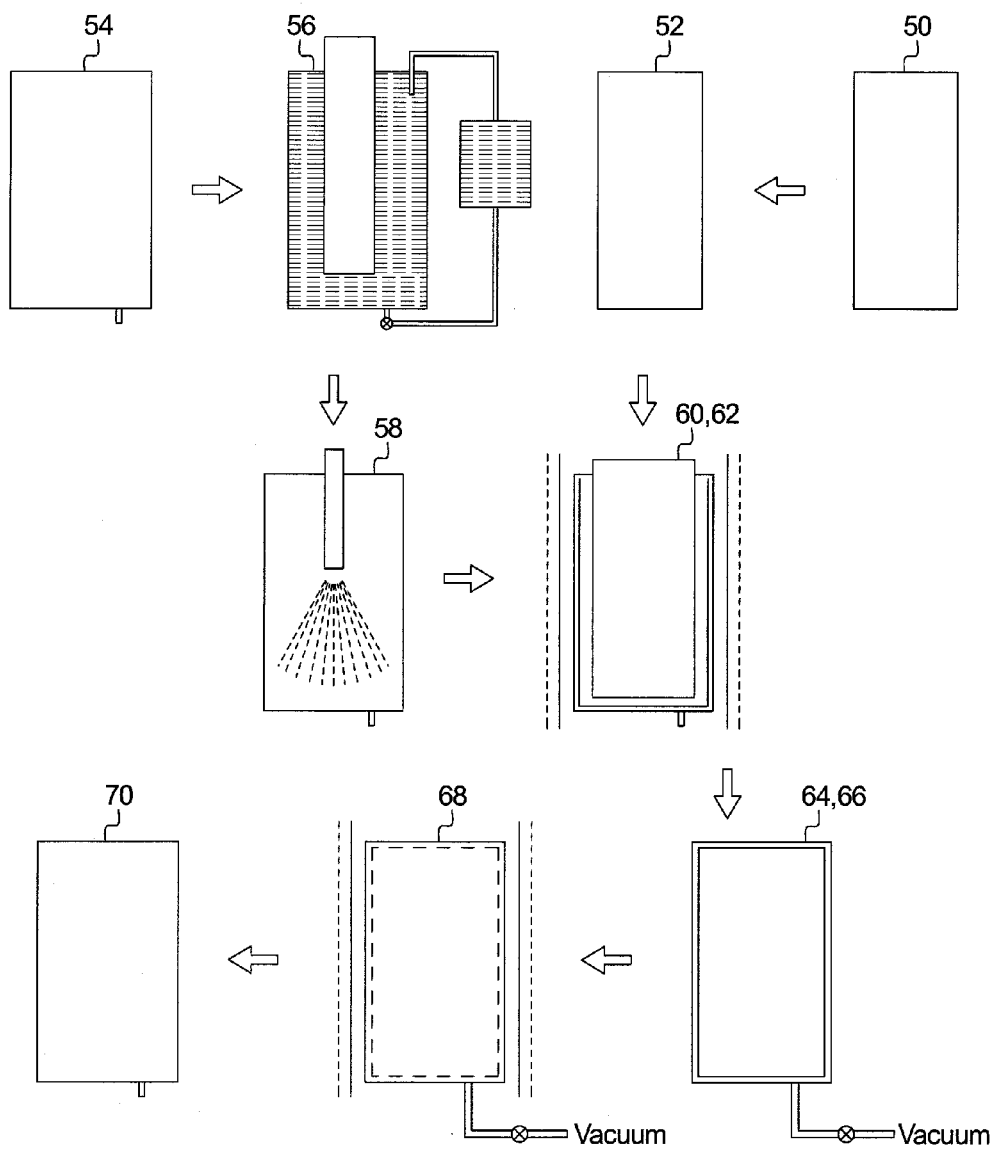
FIG. 5 is a schematic of a method of processing an alloy workpiece according to various non-limiting embodiments disclosed herein.

In certain non-limiting embodiments, referring to FIG. 5, a method of processing an alloy workpiece to reduce thermal cracking may generally comprise: providing 50 an ingot; grinding 52 the ingot to form a tapered ingot; providing 54 a tapered metallic canister; depositing 56 a nickel-boron coating by one of electroless plating, spray forming, or cold spraying onto at least a portion of an inner surface of the metallic canister; rinsing 58 and drying 60 the inner surface of the metallic canister; inserting 62 the alloy workpiece into the metallic canister; encapsulating 64 the alloy workpiece in the metallic canister to form a canned assembly; removing 66 at least a portion of gas and/or moisture from the interior of the canned assembly under vacuum; heating 68 the canned assembly under vacuum to transient liquid phase bond the alloy workpiece to the interior surface of the metallic canister to form 70 a canned alloy workpiece.

According to certain non-limiting embodiments, a coated alloy workpiece or a canned alloy workpiece produced by an embodiment of the methods disclosed herein may be hot worked. Hot working the coated or canned alloy workpiece may comprise applying a force to the coated or canned workpiece to deform the workpiece. The force may be applied with, for example, dies and/or rolls. In certain non-limiting embodiments, hot working the coated or canned alloy workpiece may comprise hot working the workpiece at a temperature from 1500° F. to 2500° F. In certain non-limiting embodiments, hot working the coated or canned alloy workpiece may comprise a forging operation and/or an extrusion operation. For example, a workpiece having a metallic surface coating deposited on at least a region of a surface of the workpiece according to the methods disclosed herein, or an alloy workpiece that has been canned as disclosed herein, may be upset forged and/or draw forged. In various non-limiting embodiments, the method may comprise, after forming a metallic surface coating on the workpiece, hot working the coated workpiece by forging. In various non-limiting embodiments, the method may comprise, after forming a metallic surface coating on the workpiece, hot working the coated alloy workpiece by forging at a temperature from 1500° F. to 2500° F. In various non-limiting embodiments, the method may comprise, after forming a surface coating on the alloy workpiece, hot working the coated alloy workpiece by extruding. In various non-limiting embodiments, the method may comprise, after forming a metallic surface coating on the alloy workpiece, hot working the coated alloy workpiece by extruding at a temperature from 1500° F. to 2500° F.

An upset-and-draw forging operation may comprise one or more sequences of an upset forging operation and one or more sequences of a draw forging operation. During an upset forging operation, the end surfaces of a workpiece may be in contact with forging dies that apply force to the workpiece that compresses the length of the workpiece and increases the cross-section of the workpiece. During a draw operation, the side surfaces (e.g., the circumferential surface of a cylindrical workpiece) may be in contact with forging dies that apply force to the workpiece that compresses the cross-section of the workpiece and increases the length of the workpiece.

According to certain non-limiting embodiments, a method of processing an alloy ingot or other alloy workpiece to reduce thermal cracking may generally comprise removing at least a portion of the metallic surface coating and/or remnants of the surface coating from the workpiece. In certain non-limiting embodiments, the method may comprise, after hot working the coated workpiece, removing at least a portion of the metallic surface coating from the product formed by hot working the workpiece. Removing the surface coating material may comprise, for example, one or more of shot blasting, grinding, peeling, and turning. In certain non-limiting embodiments, peeling the hot worked coated workpiece may comprise lathe-turning.

According to certain non-limiting embodiments, a method of processing an alloy ingot or other alloy workpiece to reduce thermal cracking may generally comprise removing at least a portion of the metallic canister or remnants of the metallic canister from the workpiece. In certain non-limiting embodiments, the method may comprise, after hot working the canned workpiece, removing at least a portion of the metallic canister from the product formed by hot working the canned workpiece. Removing the canister material may comprise, for example, one or more of shot blasting, grinding, peeling, and turning. In certain non-limiting embodiments, peeling the hot worked coated workpiece may comprise lathe-turning.

In various non-limiting embodiments, an alloy ingot or other alloy workpiece that has been processed to include a metallic surface coating or that has been canned as described herein may be subjected to one or more upset-and-draw forging operations. For example, in a triple upset-and-draw forging operation, a coated or canned workpiece may be first upset forged and then draw forged. The upset and draw sequence may be repeated twice more for a total of three sequential upset and draw forging operations. In various non-limiting embodiments, a coated or canned workpiece may be subjected to one or more extrusion operations. For example, in an extrusion operation, a generally cylindrical coated or canned workpiece may be forced through a circular die, thereby decreasing the diameter and increasing the length of the workpiece. Other hot working techniques will be apparent to those having ordinary skill, and the methods according to the present disclosure may be adapted for use with one or more of such other techniques without the need for undue experimentation.

In various non-limiting embodiments, the methods disclosed herein may be used to produce a wrought billet from an alloy ingot in the form of a cast, consolidated, or spray formed ingot. The forge conversion or extrusion conversion of an ingot to a billet or other worked article may produce a finer grain structure in the article as compared to the former workpiece. The methods and processes described herein for producing coated and canned alloy workpieces may improve the yield of forged or extruded products (such as, for example, billets) from the workpieces because the material provided on the surface of the alloy workpiece may reduce the incidence of surface cracking of the workpiece during the forging and/or extrusion operations. For example, it has been observed that a metallic surface coating provided on a region of an alloy workpiece surface according to an embodiment of a method of the present disclosure tolerates the strain induced by working dies. It also has been observed that a metallic surface coating provided according to the present disclosure more readily tolerates temperature differentials between the working dies and the alloy workpiece during hot working. In this manner, it has been observed that a metallic surface coating according to the present disclosure may exhibit zero or minor surface cracking, while surface crack initiation is prevented or reduced in the underlying alloy workpiece during working.

In various non-limiting embodiments, ingots or other workpieces of various alloys having a surface coating or canned according to the present disclosure may be hot worked to form products that may be used to fabricate various articles. For example, the processes described herein may be used in processes forming billets from nickel base alloys, iron base alloys, nickel-iron base alloys, titanium base alloys, titanium-nickel base alloys, cobalt base alloys, nickel base superalloys, and other superalloys. Billets or other products formed from hot worked ingots or other alloy workpieces may be used to fabricate articles including, but not limited to, turbine components, such as, for example, disks and rings for turbine engines and various land-based turbines. Other articles fabricated from alloy ingots or other alloy workpieces processed according to various non-limiting embodiments described herein may include, but are not limited to, valves, engine components, shafts, and fasteners.

Alloy workpieces that may be processed according to the various embodiments herein may be in any suitable form. In particular non-limiting embodiments, for example, the alloy workpieces may comprise or be in the form of ingots, billets, bars, plates, tubes, sintered pre-forms, and the like.

All documents cited in herein are incorporated herein by reference unless otherwise indicated. The citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular non-limiting embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of processing an alloy workpiece to reduce thermal cracking, the method comprising:
   spraying a metallic coating material onto at least a portion of a circumferential surface of a generally cylindrical alloy workpiece to form a surface coating metallurgically bonded to the alloy workpiece;
   wherein the surface coating is more ductile than the alloy workpiece; and
   wherein the surface coating reduces heat loss from the alloy workpiece.

2. The method of claim 1, wherein the alloy workpiece is rotated about a long axis of the workpiece during the spraying of the metallic coating material onto at least a portion of the circumferential surface of the alloy workpiece.

3. The method of claim 1, wherein the metallic coating material comprises particles selected from stainless steel particles and nickel base alloy particles.

4. The method of claim 1, wherein the metallic coating material comprises particles of at least one austenitic stainless steel stainless selected from the group consisting of Type 304 stainless steel (UNS No. S30400), Type 304 L stainless steel (UNS No. S30403), Type 316 stainless steel (UNS No. S31600), and Type 316L stainless steel (UNS No. S31603).

5. The method of claim 1, herein the metallic coating material comprises particles of at least one nickel base alloy selected from the group consisting of alloy 600 (UNS No. N06600) and alloy 625 (UNS No. N06625).

6. The method of claim 1, wherein spraying a metallic coating material onto at least a portion of the circumferential surface comprises spraying the metallic coating material onto at least a portion of the circumferential surface of the alloy workpiece at a temperature less than the melting point of the metallic coating material and the melting point of the alloy workpiece.

7. The method of claim 6, wherein spraying a metallic coating material onto at least a portion of the circumferential surface comprises spraying solid metallic particles onto the circumferential surface.

8. The method of claim 6, wherein the metallic coating material comprises solid metallic particles.

9. The method of claim 1, wherein spraying a metallic coating material onto at least a portion of the circumferential surface comprises:
   spraying the metallic coating material onto at least a portion of the circumferential surface of the alloy workpiece at a temperature greater than or equal to the melting point of the metallic coating material and less than the melting point of the alloy workpiece.

10. The method of claim 9, wherein spraying a metallic coating material onto at least a portion of the circumferential surface comprises at least one of semi-molten metallic particles and molten metallic droplets onto the circumferential surface.

11. The method of claim 9, wherein the metallic coating material comprises at least one of semi-molten metallic particles and molten metallic droplets.

12. The method claim 1, further comprising, prior to spraying a metallic coating material onto at least a portion of the circumferential surface:
   heating at least a portion of the circumferential surface of the alloy workpiece to a temperature greater than 2000° F.

13. The method of claim 1, wherein the alloy workpiece comprises a material selected from the group consisting of a nickel base alloy, a nickel base superalloy, an iron base alloy, a nickel-iron base alloy, a titanium base alloy, a titanium-nickel base alloy, and a cobalt base alloy.

14. The method of claim 1, wherein the alloy workpiece comprises a material selected from the group consisting of Alloy 718 (UNS No. N07718), Alloy 720 (UNS No. N07720), Rene 41™ alloy (UNS No. N07041), Rene 88™ alloy, Waspaloy® alloy (UNS No. N07001), and Inconel® 100 alloy.

15. The method of claim 1, wherein the metallic coating material and the alloy workpiece comprise a base metal selected from the group consisting of cobalt, iron, and nickel.

16. The method of claim 15, wherein the base metal of the metallic coating material is the same as the base metal of the alloy workpiece.

17. The method of claim 15, wherein the base metal of the metallic coating material differs from the base metal of the alloy workpiece.

18. The method of claim 1, further comprising, prior to spraying a metallic coating material onto at least a portion of the circumferential surface:
   conditioning at least a portion of the circumferential surface of the alloy workpiece.

19. The method of claim 2, further comprising:
   moving the alloy workpiece in a direction along the long axis of the alloy workpiece after completing at least one rotation of the alloy workpiece;
   spraying the metallic coating material onto a subsequent portion of the circumferential surface of the alloy workpiece; and
   repeating the moving and spraying until a desired metallic coating thickness is achieved.

20. The method of claim 1, further comprising:
   spraying the metallic coating material onto at least a portion of a longitudinal end of the alloy workpiece to form a surface coating metallurgically bonded to the alloy workpiece.

21. The method of claim 1, further comprising, after spraying a metallic coating material onto at least a portion of the circumferential surface:
   rolling the alloy workpiece to consolidate the metallic surface coating.

22. The method of claim 1, further comprising, after spraying a metallic coating material onto at least a portion of the circumferential surface:
   hot working the alloy workpiece by at least one of forging and extruding to deform the alloy workpiece.

23. The method of claim 22, further comprising, after hot working the alloy workpiece:
   removing at least a portion of the metallic surface coating from the alloy workpiece.

24. A method of processing an alloy workpiece to reduce thermal cracking, the method comprising:
   inserting the alloy workpiece into a metallic canister, wherein the metallic canister has a lower coefficient of thermal expansion than the alloy workpiece and includes an inner surface comprising a nickel-boron coating on at least a portion of the inner surface;
   encapsulating the alloy workpiece in the metallic canister to provide a canned assembly;
   removing at least a portion of gas from the interior of the canned assembly; and heating the canned assembly to transient liquid phase bond the alloy workpiece to the metallic canister.

25. The method of claim 24, wherein the coefficient of thermal expansion of the metallic canister is at least 20 percent less than the coefficient of thermal expansion of the alloy workpiece.

26. The method of claim 24, wherein heating the canned assembly to transient liquid phase bond the alloy workpiece to the metallic canister metallurgically bonds the alloy workpiece to the metallic canister.

27. The method of claim 24, wherein encapsulating the alloy workpiece in the metallic canister comprises welding a metallic cover to an open end of the metallic canister.

28. The method of claim 27, further comprising:
providing an outlet in at least one of the metallic canister and metallic cover; and
applying a vacuum to the outlet to remove at least a portion of gas from the canned assembly.

29. The method of claim 24, wherein heating the canned assembly comprises heating the canned assembly to a homogenization temperature at which the alloy workpiece is homogenized and which is greater than or equal to the melting temperature of the nickel-boron coating.

30. The method of claim 29, wherein the homogenization temperature is 2100° F. to 2200° F. and the melting temperature of the nickel-boron coating is 1800° F. to 2000° F.

31. The method of claim 29, wherein heating the canned assembly comprises:
heating the canned assembly at a temperature of 1850° F. to 1930° F. for up to two hours to melt the nickel-boron coating and, subsequently:
heating the canned assembly to a homogenization temperature of 2100° F. to 2200° F.

32. The method of claim 29, wherein heating the canned assembly to a homogenization temperature of 2100° F. to 2200° F. comprises holding the canned assembly at the homogenization temperature for 36 hours to 48 hours.

33. The method of claim 24, wherein the alloy workpiece comprises a tapered, generally cylindrical outer surface and the metallic canister comprises a complementary tapered, generally cylindrical inner surface.

34. The method of claim 24, wherein metallic canister comprises a material selected from the group consisting of a nickel base alloy, an iron base alloy, and a stainless steel.

35. The method of claim 34, wherein the metallic canister comprises a material selected from Alloy 902 (UNS No. N09902) and Type 430 stainless steel (UNS No. S43000).

36. The method of claim 24, wherein the alloy workpiece comprises a material selected from the group consisting of Alloy 718 (UNS No. N07718), Alloy 720 (UNS No. N07720), Rene 41™ alloy (UNS No. N07041), Rene 88™ alloy, Waspaloy® alloy (UNS No. N07001), and Inconel® 100 alloy.

37. The method of claim 24, wherein the metallic canister and the alloy workpiece comprise a base metal selected from the group consisting of cobalt, iron, and nickel.

38. The method of claim 37, wherein the base metal of the metallic canister and the base metal of the alloy workpiece are different.

39. The method of claim 24, further comprising, prior to inserting the alloy workpiece into the metallic canister:
grinding at least a region of at least one of an outer surface of the alloy workpiece and an inner surface of the metallic canister.

40. The method of claim 24, further comprising, prior to inserting the alloy workpiece into the metallic canister:
heating the metallic canister.

41. The method of claim 24, wherein in the canned assembly, the alloy workpiece contacts at least a portion of the nickel-boron coating.

42. The method of claim 24, wherein the canned assembly lacks a gap between the alloy workpiece and the metallic canister.

43. The method of claim 24, further comprising:
simultaneously removing at least a portion of gas from an interior of the canned assembly and heating the canned assembly to transient liquid phase bond the alloy workpiece to the metallic canister.

44. The method of claim 24, further comprising:
depositing a nickel-boron coating on at least a portion of an inner surface of the metallic canister by electroless plating to form the nickel-boron coating.

45. The method of claim 44, wherein the nickel-boron coating comprises 3 to 5 weight percent boron.

46. The method of claim 44, wherein the nickel-boron coating has a thickness from 0.005 inches to 0.01 inches.

47. The method of claim 24, further comprising, after heating the canned assembly to transient liquid phase bond the alloy workpiece to the metallic canister:
hot working the canned assembly by at least one of forging and extruding to deform the canned assembly.

48. The method of claim 47, further comprising, after hot working the canned assembly:
removing at least a portion of the metallic canister from the deformed canned assembly.

49. A method of processing an alloy workpiece to reduce thermal cracking, the method comprising:
spraying a metallic coating material onto at least a portion of a surface of an alloy workpiece to form a surface coating metallurgically bonded to the alloy workpiece;
wherein the surface coating is more ductile than the alloy workpiece;
wherein the surface coating reduces heat loss from the alloy workpiece; and
wherein the alloy workpiece is rotated about a long axis of the workpiece during the spraying of the metallic coating material onto at least a portion of the surface of the alloy workpiece.

50. The method of claim 49, wherein the metallic coating material comprises particles selected from stainless steel particles and nickel base alloy particles.

51. The method of claim 49, wherein the metallic coating material comprises particles of at least one austenitic stainless steel stainless selected from the group consisting of Type 304 stainless steel (UNS No. S30400), Type 304 L stainless steel (UNS No. S30403), Type 316 stainless steel (UNS No. S31600), and Type 316L stainless steel (UNS No. S31603).

52. The method of claim 49, wherein the metallic coating material comprises particles of at least one nickel base alloy selected from the group consisting of alloy 600 (UNS No. N06600) and alloy 625 (UNS No. N06625).

53. The method claim 49, further comprising, prior to spraying a metallic coating material onto at least a portion of the surface:
heating at least a portion of the surface of the alloy workpiece to a temperature greater than 2000° F.

54. The method of claim 49, wherein the alloy workpiece comprises a material selected from the group consisting of a nickel base alloy, a nickel base superalloy, an iron base alloy, a nickel-iron base alloy, a titanium base alloy, a titanium-nickel base alloy, and a cobalt base alloy.

55. The method of claim 49, wherein the alloy workpiece comprises a material selected from the group consisting of Alloy 718 (UNS No. N07718), Alloy 720 (UNS No.

N07720), Rene 41™ alloy (UNS No. N07041), Rene 88™ alloy, Waspaloy® alloy (UNS No. N07001), and Inconel® 100 alloy.

56. The method of claim 49, wherein spraying a metallic coating material onto at least a portion of the surface comprises spraying the metallic coating material onto at least a portion of the surface of the alloy workpiece at a temperature less than the melting point of the metallic coating material and the melting point of the alloy workpiece.

57. The method of claim 49, wherein spraying a metallic coating material onto at least a portion of the surface comprises spraying solid metallic particles onto the surface.

58. The method of claim 49, wherein spraying a metallic coating material onto at least a portion of the surface comprises:
spraying the metallic coating material onto at least a portion of the surface of the alloy workpiece at a temperature greater than or equal to the melting point of the metallic coating material and less than the melting point of the alloy workpiece.

59. The method of claim 49, wherein spraying a metallic coating material onto at least a portion of the surface comprises spraying at least one of semi-molten metallic particles and molten metallic droplets onto the surface.

60. A method of processing an alloy workpiece to reduce thermal cracking, the method comprising:
spraying a metallic coating material onto at least a portion of a surface of an alloy workpiece to form a surface coating metallurgically bonded to the alloy workpiece;
wherein the surface coating is more ductile than the alloy workpiece;
wherein the surface coating reduces heat loss from the alloy workpiece; and
wherein the metallic coating material comprises particles selected from stainless steel particles and nickel base alloy particles.

61. The method of claim 60, wherein the metallic coating material comprises particles of at least one austenitic stainless steel stainless selected from the group consisting of Type 304 stainless steel (UNS No. S30400), Type 304 L stainless steel (UNS No. S30403), Type 316 stainless steel (UNS No. S31600), and Type 316L stainless steel (UNS No. S31603).

62. The method of claim 60, wherein the metallic coating material comprises particles of at least one nickel base alloy selected from the group consisting of alloy 600 (UNS No. N06600) and alloy 625 (UNS No. N06625).

63. The method of claim 60, wherein the alloy workpiece comprises a material selected from the group consisting of a nickel base alloy, a nickel base superalloy, an iron base alloy, a nickel-iron base alloy, a titanium base alloy, a titanium-nickel base alloy, and a cobalt base alloy.

64. The method of claim 60, wherein the alloy workpiece comprises a material selected from the group consisting of Alloy 718 (UNS No. N07718), Alloy 720 (UNS No. N07720), Rene 41™ alloy (UNS No. N07041), Rene 88™ alloy, Waspaloy® alloy (UNS No. N07001), and Inconel® 100 alloy.

65. The method of claim 60, wherein spraying a metallic coating material onto at least a portion of the surface comprises spraying the metallic coating material onto at least a portion of the surface of the alloy workpiece at a temperature less than the melting point of the metallic coating material and the melting point of the alloy workpiece.

66. The method of claim 60, wherein spraying a metallic coating material onto at least a portion of the surface comprises spraying solid metallic particles onto the surface.

67. The method of claim 60, wherein spraying a metallic coating material onto at least a portion of the surface comprises:
spraying the metallic coating material onto at least a portion of the surface of the alloy workpiece at a temperature greater than or equal to the melting point of the metallic coating material and less than the melting point of the alloy workpiece.

68. The method of claim 60, wherein spraying a metallic coating material onto at least a portion of the surface comprises spraying at least one of semi-molten metallic particles and molten metallic droplets onto the surface.

69. The method claim 60, further comprising, prior to spraying a metallic coating material onto at least a portion of the surface:
heating at least a portion of the surface of the alloy workpiece to a temperature greater than 2000° F.

70. A method of processing an alloy workpiece to reduce thermal cracking, the method comprising:
spraying a metallic coating material onto at least a portion of a surface of an alloy workpiece to form a surface coating metallurgically bonded to the alloy workpiece;
wherein the surface coating is more ductile than the alloy workpiece;
wherein the surface coating reduces heat loss from the alloy workpiece; and
wherein prior to spraying a metallic coating material onto at least a portion of the surface, at least a portion of the surface is heated to a temperature greater than 2000° F.

71. The method of claim 70, wherein the metallic coating material comprises particles of at least one austenitic stainless steel stainless selected from the group consisting of Type 304 stainless steel (UNS No. S30400), Type 304 L stainless steel (UNS No. S30403), Type 316 stainless steel (UNS No. S31600), and Type 316L stainless steel (UNS No. S31603).

72. The method of claim 70, wherein the metallic coating material comprises particles of at least one nickel base alloy selected from the group consisting of alloy 600 (UNS No. N06600) and alloy 625 (UNS No. N06625).

73. The method of claim 70, wherein the alloy workpiece comprises a material selected from the group consisting of a nickel base alloy, a nickel base superalloy, an iron base alloy, a nickel-iron base alloy, a titanium base alloy, a titanium-nickel base alloy, and a cobalt base alloy.

74. The method of claim 70, wherein the alloy workpiece comprises a material selected from the group consisting of Alloy 718 (UNS No. N07718), Alloy 720 (UNS No. N07720), Rene 41™ alloy (UNS No. N07041), Rene 88™ alloy, Waspaloy® alloy (UNS No. N07001), and Inconel® 100 alloy.

75. The method of claim 70, wherein spraying a metallic coating material onto at least a portion of the surface comprises spraying the metallic coating material onto at least a portion of the surface of the alloy workpiece at a temperature less than the melting point of the metallic coating material and the melting point of the alloy workpiece.

76. The method of claim 70, wherein spraying a metallic coating material onto at least a portion of the surface comprises spraying solid metallic particles onto the surface.

77. The method of claim 70, wherein spraying a metallic coating material onto at least a portion of the surface comprises:
spraying the metallic coating material onto at least a portion of the surface of the alloy workpiece at a temperature greater than or equal to the melting point of the metallic coating material and less than the melting point of the alloy workpiece.

78. The method of claim 70, wherein spraying a metallic coating material onto at least a portion of the surface comprises spraying at least one of semi-molten metallic particles and molten metallic droplets onto the surface.

79. A method of processing an alloy workpiece to reduce thermal cracking, the method comprising:
spraying a metallic coating material onto at least a portion of a surface of an alloy workpiece to form a surface coating metallurgically bonded to the alloy workpiece;
wherein the alloy workpiece comprises a material selected from the group consisting of a nickel base alloy, a nickel base superalloy, an iron base alloy, a nickel-iron base alloy, a titanium base alloy, a titanium-nickel base alloy, and a cobalt base alloy;
wherein the surface coating is more ductile than the alloy workpiece; and
wherein the surface coating reduces heat loss from the alloy workpiece.

80. The method of claim 79, wherein the alloy workpiece comprises a material selected from the group consisting of Alloy 718 (UNS No. N07718), Alloy 720 (UNS No. N07720), Rene 41™ alloy (UNS No. N07041), Rene 88™ alloy, Waspaloy® alloy (UNS No. N07001), and Inconel® 100 alloy.

81. The method of claim 79, wherein the metallic coating material comprises particles of at least one austenitic stainless steel stainless selected from the group consisting of Type 304 stainless steel (UNS No. S30400), Type 304 L stainless steel (UNS No. S30403), Type 316 stainless steel (UNS No. S31600), and Type 316L stainless steel (UNS No. S31603).

82. The method of claim 79, wherein the metallic coating material comprises particles of at least one nickel base alloy selected from the group consisting of alloy 600 (UNS No. N06600) and alloy 625 (UNS No. N06625).

83. The method of claim 79, wherein spraying a metallic coating material onto at least a portion of the surface comprises spraying the metallic coating material onto at least a portion of the surface of the alloy workpiece at a temperature less than the melting point of the metallic coating material and the melting point of the alloy workpiece.

84. The method of claim 79, wherein spraying a metallic coating material onto at least a portion of the surface comprises spraying solid metallic particles onto the surface.

85. The method of claim 79, wherein spraying a metallic coating material onto at least a portion of the surface comprises:
spraying the metallic coating material onto at least a portion of the surface of the alloy workpiece at a temperature greater than or equal to the melting point of the metallic coating material and less than the melting point of the alloy workpiece.

86. The method of claim 79, wherein spraying a metallic coating material onto at least a portion of the surface comprises spraying at least one of semi-molten metallic particles and molten metallic droplets onto the surface.

* * * * *